US009984428B2

(12) United States Patent
Doyle et al.

(10) Patent No.: US 9,984,428 B2
(45) Date of Patent: May 29, 2018

(54) SYSTEMS AND METHODS FOR STRUCTURING DATA FROM UNSTRUCTURED ELECTRONIC DATA FILES

(71) Applicant: PALANTIR TECHNOLOGIES INC., Palo Alto, CA (US)

(72) Inventors: John McKinstry Doyle, Washington, DC (US); Mitch Beard, Falls Church, VA (US); Christopher Brahms, Vienna, VA (US); Tristan Huber, New York City, NY (US); Krasimira Kapitanova, Tyson's Corner, VA (US); Ohsuk Kwon, Fort Lee, NJ (US); Christopher Richbourg, Arlington, VA (US); Michael Stoeckel, Washington, DC (US); Seth Robinson, Brooklyn, NY (US)

(73) Assignee: Palantir Technologies Inc., Palo Alto, CA (US)

( * ) Notice: Subject to any disclaimer, the term of this patent is extended or adjusted under 35 U.S.C. 154(b) by 42 days.

(21) Appl. No.: 14/923,712

(22) Filed: Oct. 27, 2015

(65) Prior Publication Data

US 2017/0069043 A1    Mar. 9, 2017

Related U.S. Application Data

(60) Provisional application No. 62/214,856, filed on Sep. 4, 2015.

(51) Int. Cl.
*G06Q 50/18* (2012.01)
*G06Q 10/10* (2012.01)
(Continued)

(52) U.S. Cl.
CPC ......... *G06Q 50/18* (2013.01); *G06F 17/2705* (2013.01); *G06F 17/30011* (2013.01);
(Continued)

(58) Field of Classification Search
None
See application file for complete search history.

(56) References Cited

U.S. PATENT DOCUMENTS 5,241,625 A    8/1993  Epard et al.
5,826,021 A   10/1998  Mastors et al.
(Continued)

FOREIGN PATENT DOCUMENTS

AU    2013251186    11/2015
CN    102546446     7/2012
(Continued)

OTHER PUBLICATIONS

Chaudhuri et al., "An Overview of Business Intelligence Technology," Communications of the ACM, Aug. 2011, vol. 54, No. 8.
(Continued)

*Primary Examiner* — Jan P Mincarelli
(74) *Attorney, Agent, or Firm* — Schwegman Lundberg & Woessner, P.A.

(57) ABSTRACT

Computer implemented systems and methods are disclosed for structuring data from unstructured electronic data files. In accordance with some embodiments, an electronic data file including unstructured content associated with a legal process return is received and the unstructured content parsed. The unstructured content is parsed to identify one or more objects and properties based on a database ontology that are processed to generate an object model. A data report may be generated based on the identified objects and properties.

13 Claims, 9 Drawing Sheets

(51) Int. Cl.
  *G06F 17/27* (2006.01)
  *G06F 17/30* (2006.01)
  *G06Q 50/00* (2012.01)

(52) U.S. Cl.
  CPC .. *G06F 17/30401* (2013.01); *G06F 17/30528* (2013.01); *G06F 17/30554* (2013.01); *G06F 17/30716* (2013.01); *G06Q 10/10* (2013.01); *G06Q 50/01* (2013.01); *G06Q 2230/00* (2013.01)

(56) References Cited

U.S. PATENT DOCUMENTS

| | | |
|---|---|---|
| 5,832,218 A | 11/1998 | Gibbs et al. |
| 5,845,300 A | 12/1998 | Comer |
| 5,878,434 A | 3/1999 | Draper et al. |
| 5,897,636 A | 4/1999 | Kaeser |
| 5,966,706 A | 10/1999 | Biliris et al. |
| 5,999,911 A | 12/1999 | Berg et al. |
| 6,006,242 A | 12/1999 | Poole et al. |
| 6,057,757 A | 5/2000 | Arrowsmith et al. |
| 6,065,026 A | 5/2000 | Cornelia et al. |
| 6,134,582 A | 10/2000 | Kennedy |
| 6,232,971 B1 | 5/2001 | Haynes |
| 6,237,138 B1 | 5/2001 | Hameluck et al. |
| 6,243,706 B1 | 6/2001 | Moreau et al. |
| 6,243,717 B1 | 6/2001 | Gordon et al. |
| 6,370,538 B1 | 4/2002 | Lamping et al. |
| 6,430,305 B1 | 8/2002 | Decker |
| 6,463,404 B1 | 10/2002 | Appleby |
| 6,519,627 B1 | 2/2003 | Dan et al. |
| 6,523,019 B1 | 2/2003 | Borthwick |
| 6,665,683 B1 | 12/2003 | Meltzer |
| 6,820,135 B1 | 11/2004 | Dingman |
| 6,850,317 B2 | 2/2005 | Mullins et al. |
| 6,944,821 B1 | 9/2005 | Bates et al. |
| 6,967,589 B1 | 11/2005 | Peters |
| 6,978,419 B1 | 12/2005 | Kantrowitz |
| 6,980,984 B1 | 12/2005 | Huffman et al. |
| 7,058,648 B1 | 6/2006 | Lightfoot et al. |
| 7,086,028 B1 | 8/2006 | Davis et al. |
| 7,089,541 B2 | 8/2006 | Ungar |
| 7,168,039 B2 | 1/2007 | Bertram |
| 7,174,377 B2 | 2/2007 | Bernard et al. |
| 7,194,680 B1 | 3/2007 | Roy et al. |
| 7,213,030 B1 | 5/2007 | Jenkins |
| 7,392,254 B1 | 6/2008 | Jenkins |
| 7,403,942 B1 | 7/2008 | Bayliss |
| 7,441,182 B2 | 10/2008 | Beilinson et al. |
| 7,441,219 B2 | 10/2008 | Perry et al. |
| 7,461,077 B1 | 12/2008 | Greenwood |
| 7,461,158 B2 | 12/2008 | Rider et al. |
| 7,617,232 B2 | 11/2009 | Gabbert et al. |
| 7,627,489 B2 | 12/2009 | Schaeffer et al. |
| 7,739,246 B2 | 6/2010 | Mooney et al. |
| 7,756,843 B1 | 7/2010 | Palmer |
| 7,757,220 B2 | 7/2010 | Griffith et al. |
| 7,765,489 B1 | 7/2010 | Shah et al. |
| 7,877,421 B2 | 1/2011 | Berger et al. |
| 7,880,921 B2 | 2/2011 | Dattilo et al. |
| 7,899,796 B1 | 3/2011 | Borthwick et al. |
| 7,912,842 B1 | 3/2011 | Bayliss |
| 7,917,376 B2 | 3/2011 | Bellin et al. |
| 7,941,321 B2 | 5/2011 | Greenstein et al. |
| 7,941,336 B1 | 5/2011 | Robin-Jan |
| 7,966,199 B1 | 5/2011 | Frasher |
| 7,958,147 B1 | 6/2011 | Turner et al. |
| 7,962,495 B2 * | 6/2011 | Jain ............... G06F 17/2705 706/2 |
| 8,010,507 B2 | 8/2011 | King et al. |
| 8,036,971 B2 | 10/2011 | Aymeloglu et al. |
| 8,037,046 B2 | 10/2011 | Udezue et al. |
| 8,046,283 B2 | 10/2011 | Burns |
| 8,054,756 B2 | 11/2011 | Chand et al. |
| 8,073,857 B2 | 12/2011 | Sreekanth |
| 8,117,022 B2 | 2/2012 | Linker |
| 8,126,848 B2 | 2/2012 | Wagner |
| 8,147,715 B2 | 4/2012 | Bruckhaus et al. |
| 8,191,005 B2 | 5/2012 | Baier et al. |
| 8,214,490 B1 | 7/2012 | Vos et al. |
| 8,229,902 B2 | 7/2012 | Vishniac et al. |
| 8,290,838 B1 | 10/2012 | Thakur et al. |
| 8,302,855 B2 | 11/2012 | Ma et al. |
| 8,364,642 B1 | 1/2013 | Garrod |
| 8,386,377 B1 | 2/2013 | Xiong et al. |
| 8,429,527 B1 | 4/2013 | Arbogast |
| 8,473,454 B2 | 6/2013 | Evanitsky et al. |
| 8,484,115 B2 | 7/2013 | Aymeloglu et al. |
| 8,489,641 B1 | 7/2013 | Seefeld et al. |
| 8,527,949 B1 | 9/2013 | Pleis et al. |
| 8,554,719 B2 | 10/2013 | McGrew |
| 8,577,911 B1 | 11/2013 | Stepinski et al. |
| 8,589,273 B2 | 11/2013 | Creeden et al. |
| 8,601,326 B1 | 12/2013 | Kim |
| 8,639,552 B1 | 1/2014 | Chen et al. |
| 8,682,696 B1 | 3/2014 | Shanmugam |
| 8,683,322 B1 * | 3/2014 | Cooper ............... H04L 63/102 707/602 |
| 8,688,573 B1 | 4/2014 | Rukonic et al. |
| 8,732,574 B2 | 5/2014 | Burr et al. |
| 8,744,890 B1 | 6/2014 | Bernier |
| 8,798,354 B1 | 8/2014 | Bunzel et al. |
| 8,799,313 B2 | 8/2014 | Satlow |
| 8,799,799 B1 | 8/2014 | Cervelli et al. |
| 8,806,355 B2 | 8/2014 | Twiss et al. |
| 8,807,948 B2 | 8/2014 | Luo et al. |
| 8,812,444 B2 | 8/2014 | Garrod et al. |
| 8,812,960 B1 | 8/2014 | Sun et al. |
| 8,838,538 B1 | 9/2014 | Landau et al. |
| 8,855,999 B1 | 10/2014 | Elliot |
| 8,903,717 B2 | 12/2014 | Elliot |
| 8,924,388 B2 | 12/2014 | Elliot et al. |
| 8,924,389 B2 | 12/2014 | Elliot et al. |
| 8,930,874 B2 | 1/2015 | Duff et al. |
| 8,938,434 B2 | 1/2015 | Jain et al. |
| 8,938,686 B1 | 1/2015 | Erenrich et al. |
| 8,949,164 B1 | 2/2015 | Mohler |
| 8,984,390 B2 | 3/2015 | Aymeloglu et al. |
| 9,049,117 B1 * | 6/2015 | Nucci ............... H04L 63/302 |
| 9,058,315 B2 | 6/2015 | Burr et al. |
| 9,069,842 B2 | 6/2015 | Melby |
| 9,100,428 B1 | 8/2015 | Visbal |
| 9,105,000 B1 | 8/2015 | White et al. |
| 9,111,281 B2 | 8/2015 | Stibel et al. |
| 9,129,219 B1 | 9/2015 | Robertson et al. |
| 9,165,100 B2 | 10/2015 | Begur et al. |
| 9,230,060 B2 | 1/2016 | Friedlander et al. |
| 9,256,664 B2 | 2/2016 | Chakerian et al. |
| 2002/0032677 A1 | 3/2002 | Moregenthaler et al. |
| 2002/0035590 A1 | 3/2002 | Eibach et al. |
| 2002/0065708 A1 | 5/2002 | Senay et al. |
| 2002/0095360 A1 | 7/2002 | Joao |
| 2002/0095658 A1 | 7/2002 | Shulman |
| 2002/0103705 A1 | 8/2002 | Brady |
| 2002/0147805 A1 | 10/2002 | Leshem et al. |
| 2002/0194058 A1 | 12/2002 | Eldering |
| 2002/0196229 A1 | 12/2002 | Chen et al. |
| 2003/0036927 A1 | 2/2003 | Bowen |
| 2003/0088438 A1 | 5/2003 | Maughan et al. |
| 2003/0093401 A1 | 5/2003 | Czahowski et al. |
| 2003/0093755 A1 | 5/2003 | O'Carroll |
| 2003/0105759 A1 | 6/2003 | Bess et al. |
| 2003/0115481 A1 | 6/2003 | Baird et al. |
| 2003/0126102 A1 | 7/2003 | Borthwick |
| 2003/0171942 A1 | 9/2003 | Gaito |
| 2003/0177112 A1 | 9/2003 | Gardner |
| 2003/0182313 A1 | 9/2003 | Federwisch et al. |
| 2003/0212718 A1 | 11/2003 | Tester |
| 2004/0003009 A1 | 1/2004 | Wilmot |
| 2004/0006523 A1 | 1/2004 | Coker |
| 2004/0034570 A1 | 2/2004 | Davis |
| 2004/0044648 A1 | 3/2004 | Anfindsen et al. |
| 2004/0083466 A1 | 4/2004 | Dapp et al. |
| 2004/0088177 A1 | 5/2004 | Travis et al. |

(56) References Cited

U.S. PATENT DOCUMENTS

| | | |
|---|---|---|
| 2004/0111480 A1 | 6/2004 | Yue |
| 2004/0117387 A1 | 6/2004 | Civetta et al. |
| 2004/0153418 A1 | 8/2004 | Hanweck |
| 2004/0153451 A1 | 8/2004 | Philips et al. |
| 2004/0205492 A1 | 10/2004 | Newsome |
| 2004/0210763 A1 | 10/2004 | Jonas |
| 2004/0236688 A1 | 11/2004 | Bozeman |
| 2004/0236711 A1 | 11/2004 | Nixon et al. |
| 2005/0010472 A1 | 1/2005 | Quatse et al. |
| 2005/0028094 A1 | 2/2005 | Allyn |
| 2005/0039116 A1 | 2/2005 | Slack-Smith |
| 2005/0086207 A1 | 4/2005 | Heuer et al. |
| 2005/0091186 A1 | 4/2005 | Alon |
| 2005/0097441 A1 | 5/2005 | Herbach et al. |
| 2005/0102328 A1 | 5/2005 | Ring et al. |
| 2005/0125715 A1 | 6/2005 | Di Franco et al. |
| 2005/0131935 A1 | 6/2005 | O'Leary et al. |
| 2005/0154628 A1 | 7/2005 | Eckart et al. |
| 2005/0154769 A1 | 7/2005 | Eckart et al. |
| 2005/0262512 A1 | 11/2005 | Schmidt et al. |
| 2006/0010130 A1 | 1/2006 | Leff et al. |
| 2006/0026120 A1 | 2/2006 | Carolan et al. |
| 2006/0026170 A1 | 2/2006 | Kreitler et al. |
| 2006/0026561 A1 | 2/2006 | Bauman et al. |
| 2006/0031779 A1 | 2/2006 | Theurer et al. |
| 2006/0053097 A1 | 3/2006 | King et al. |
| 2006/0053170 A1 | 3/2006 | Hill et al. |
| 2006/0059423 A1 | 3/2006 | Lehmann et al. |
| 2006/0080139 A1 | 4/2006 | Mainzer |
| 2006/0080283 A1 | 4/2006 | Shipman |
| 2006/0080316 A1 | 4/2006 | Gilmore et al. |
| 2006/0129746 A1 | 6/2006 | Porter |
| 2006/0136513 A1 | 6/2006 | Ngo et al. |
| 2006/0143034 A1 | 6/2006 | Rothermel |
| 2006/0143075 A1 | 6/2006 | Carr et al. |
| 2006/0143079 A1 | 6/2006 | Basak et al. |
| 2006/0155654 A1 | 7/2006 | Plessis et al. |
| 2006/0178915 A1 | 8/2006 | Chao |
| 2006/0178954 A1 | 8/2006 | Thukral et al. |
| 2006/0218206 A1 | 9/2006 | Bourbonnais et al. |
| 2006/0218941 A1 | 9/2006 | Grossman et al. |
| 2006/0253502 A1 | 11/2006 | Raman et al. |
| 2006/0265417 A1 | 11/2006 | Amato et al. |
| 2006/0277460 A1 | 12/2006 | Forstall et al. |
| 2007/0000999 A1 | 1/2007 | Kubo et al. |
| 2007/0011304 A1 | 1/2007 | Error |
| 2007/0038646 A1 | 2/2007 | Thota |
| 2007/0043686 A1 | 2/2007 | Teng et al. |
| 2007/0061752 A1 | 3/2007 | Cory |
| 2007/0067285 A1 | 3/2007 | Blume |
| 2007/0113164 A1 | 5/2007 | Hansen et al. |
| 2007/0136095 A1 | 6/2007 | Weinstein |
| 2007/0150801 A1 | 6/2007 | Chidlovskii et al. |
| 2007/0156673 A1 | 7/2007 | Maga |
| 2007/0162454 A1 | 7/2007 | D'Albora et al. |
| 2007/0168871 A1 | 7/2007 | Jenkins |
| 2007/0178501 A1 | 8/2007 | Rabinowitz et al. |
| 2007/0185850 A1 | 8/2007 | Walters et al. |
| 2007/0185867 A1 | 8/2007 | Maga |
| 2007/0192122 A1 | 8/2007 | Routson et al. |
| 2007/0233756 A1 | 10/2007 | D'Souza et al. |
| 2007/0245339 A1 | 10/2007 | Bauman et al. |
| 2007/0271317 A1 | 11/2007 | Carmel |
| 2007/0284433 A1 | 12/2007 | Domenica et al. |
| 2007/0295797 A1 | 12/2007 | Herman et al. |
| 2007/0299697 A1 | 12/2007 | Friedlander et al. |
| 2008/0005063 A1 | 1/2008 | Seeds |
| 2008/0016155 A1 | 1/2008 | Khalatian |
| 2008/0065655 A1 | 3/2008 | Chakravarthy et al. |
| 2008/0077642 A1 | 3/2008 | Carbone et al. |
| 2008/0091693 A1 | 4/2008 | Murthy |
| 2008/0109714 A1 | 5/2008 | Kumar et al. |
| 2008/0126344 A1 | 5/2008 | Hoffman et al. |
| 2008/0126951 A1 | 5/2008 | Sood et al. |
| 2008/0140387 A1 | 6/2008 | Linker |
| 2008/0172607 A1 | 7/2008 | Baer |
| 2008/0177782 A1 | 7/2008 | Poston et al. |
| 2008/0186904 A1 | 8/2008 | Koyama et al. |
| 2008/0195672 A1 | 8/2008 | Hamel et al. |
| 2008/0208735 A1 | 8/2008 | Balet et al. |
| 2008/0222295 A1 | 9/2008 | Robinson et al. |
| 2008/0228467 A1 | 9/2008 | Womack et al. |
| 2008/0249820 A1 | 10/2008 | Pathria et al. |
| 2008/0255973 A1 | 10/2008 | El Wade et al. |
| 2008/0267386 A1 | 10/2008 | Cooper |
| 2008/0270316 A1 | 10/2008 | Guidotti et al. |
| 2008/0281580 A1 | 11/2008 | Zabokritski |
| 2008/0294663 A1 | 11/2008 | Heinley et al. |
| 2008/0301042 A1 | 12/2008 | Patzer |
| 2008/0313132 A1 | 12/2008 | Hao et al. |
| 2008/0313243 A1 | 12/2008 | Poston et al. |
| 2009/0031401 A1 | 1/2009 | Cudich et al. |
| 2009/0043801 A1 | 2/2009 | LeClair et al. |
| 2009/0055487 A1 | 2/2009 | Moraes et al. |
| 2009/0089651 A1 | 4/2009 | Herberger et al. |
| 2009/0094270 A1 | 4/2009 | Alirez et al. |
| 2009/0106178 A1 | 4/2009 | Chu |
| 2009/0106242 A1 | 4/2009 | McGrew et al. |
| 2009/0112678 A1 | 4/2009 | Luzardo |
| 2009/0112745 A1 | 4/2009 | Stefanescu |
| 2009/0125359 A1 | 5/2009 | Knapic |
| 2009/0125459 A1 | 5/2009 | Norton et al. |
| 2009/0132953 A1 | 5/2009 | Reed, Jr. et al. |
| 2009/0150868 A1 | 6/2009 | Chakra et al. |
| 2009/0157732 A1 | 6/2009 | Hao et al. |
| 2009/0164387 A1 | 6/2009 | Armstrong et al. |
| 2009/0177962 A1 | 7/2009 | Gusmorino et al. |
| 2009/0187546 A1 | 7/2009 | Whyte et al. |
| 2009/0187548 A1 | 7/2009 | Ji et al. |
| 2009/0199106 A1 | 8/2009 | Jonsson et al. |
| 2009/0228365 A1 | 9/2009 | Tomchek et al. |
| 2009/0248757 A1 | 10/2009 | Havewala et al. |
| 2009/0249178 A1 | 10/2009 | Ambrosino et al. |
| 2009/0249244 A1 | 10/2009 | Robinson et al. |
| 2009/0254842 A1 | 10/2009 | Leacock et al. |
| 2009/0271343 A1 | 10/2009 | Vaiciulis et al. |
| 2009/0281839 A1 | 11/2009 | Lynn et al. |
| 2009/0282068 A1 | 11/2009 | Shockro et al. |
| 2009/0299830 A1 | 12/2009 | West et al. |
| 2009/0307049 A1 | 12/2009 | Elliott et al. |
| 2009/0313311 A1 | 12/2009 | Hoffmann et al. |
| 2009/0313463 A1 | 12/2009 | Pang et al. |
| 2009/0319418 A1 | 12/2009 | Herz |
| 2009/0319891 A1 | 12/2009 | MacKinlay |
| 2010/0030722 A1 | 2/2010 | Goodson et al. |
| 2010/0031141 A1 | 2/2010 | Summers et al. |
| 2010/0042922 A1 | 2/2010 | Bradeteanu et al. |
| 2010/0057622 A1 | 3/2010 | Faith et al. |
| 2010/0070531 A1 | 3/2010 | Aymeloglu et al. |
| 2010/0070842 A1 | 3/2010 | Aymeloglu et al. |
| 2010/0070844 A1 | 3/2010 | Aymeloglu et al. |
| 2010/0082541 A1 | 4/2010 | Kottomtharayil |
| 2010/0082671 A1 | 4/2010 | Li et al. |
| 2010/0098318 A1 | 4/2010 | Anderson |
| 2010/0106752 A1 | 4/2010 | Eckardt et al. |
| 2010/0114817 A1 | 5/2010 | Gilbert et al. |
| 2010/0114887 A1 | 5/2010 | Conway et al. |
| 2010/0131502 A1 | 5/2010 | Fordham |
| 2010/0145909 A1 | 6/2010 | Ngo |
| 2010/0161735 A1 | 6/2010 | Sharma |
| 2010/0191563 A1 | 7/2010 | Schlaifer et al. |
| 2010/0204983 A1 | 8/2010 | Chung et al. |
| 2010/0211535 A1 | 8/2010 | Rosenberger |
| 2010/0223260 A1 | 9/2010 | Wu |
| 2010/0235915 A1 | 9/2010 | Memon et al. |
| 2010/0238174 A1 | 9/2010 | Haub et al. |
| 2010/0262688 A1 | 10/2010 | Hussain et al. |
| 2010/0262901 A1 | 10/2010 | DiSalvo |
| 2010/0280851 A1 | 11/2010 | Merkin |
| 2010/0293174 A1 | 11/2010 | Bennett et al. |
| 2010/0306285 A1 | 12/2010 | Shah et al. |
| 2010/0306722 A1 | 12/2010 | LeHoty et al. |
| 2010/0312837 A1 | 12/2010 | Bodapati et al. |
| 2010/0313239 A1 | 12/2010 | Chakra et al. |

(56) References Cited

U.S. PATENT DOCUMENTS

| | | |
|---|---|---|
| 2011/0004626 A1 | 1/2011 | Naeymi-Rad et al. |
| 2011/0047540 A1 | 2/2011 | Williams et al. |
| 2011/0061013 A1 | 3/2011 | Billicki et al. |
| 2011/0066497 A1 | 3/2011 | Gopinath et al. |
| 2011/0074788 A1 | 3/2011 | Regan et al. |
| 2011/0078173 A1 | 3/2011 | Seligmann et al. |
| 2011/0093327 A1 | 4/2011 | Fordyce et al. |
| 2011/0099133 A1 | 4/2011 | Chang et al. |
| 2011/0153384 A1 | 6/2011 | Horne et al. |
| 2011/0161409 A1 | 6/2011 | Nair et al. |
| 2011/0173093 A1 | 7/2011 | Psota et al. |
| 2011/0179048 A1 | 7/2011 | Satlow |
| 2011/0202555 A1* | 8/2011 | Cordover ............ G06Q 10/107 707/769 |
| 2011/0208565 A1 | 8/2011 | Ross et al. |
| 2011/0208724 A1 | 8/2011 | Jones et al. |
| 2011/0208822 A1 | 8/2011 | Rathod |
| 2011/0213655 A1 | 9/2011 | Henkin |
| 2011/0218955 A1 | 9/2011 | Tang |
| 2011/0225482 A1 | 9/2011 | Chan et al. |
| 2011/0225586 A1 | 9/2011 | Bentley et al. |
| 2011/0252282 A1 | 10/2011 | Meek et al. |
| 2011/0258216 A1 | 10/2011 | Supakkul et al. |
| 2011/0270604 A1 | 11/2011 | Qi et al. |
| 2011/0270834 A1 | 11/2011 | Sokolan et al. |
| 2011/0289397 A1 | 11/2011 | Eastmond et al. |
| 2011/0295649 A1 | 12/2011 | Fine |
| 2011/0314007 A1 | 12/2011 | Dassa et al. |
| 2011/0314024 A1 | 12/2011 | Chang et al. |
| 2012/0004894 A1 | 1/2012 | Butler et al. |
| 2012/0004904 A1 | 1/2012 | Shin et al. |
| 2012/0011238 A1 | 1/2012 | Rathod |
| 2012/0011245 A1 | 1/2012 | Gillette et al. |
| 2012/0013684 A1 | 1/2012 | Lucia |
| 2012/0022945 A1 | 1/2012 | Falkenborg et al. |
| 2012/0054284 A1 | 3/2012 | Rakshit |
| 2012/0059853 A1 | 3/2012 | Jagota |
| 2012/0066166 A1 | 3/2012 | Curbera et al. |
| 2012/0078595 A1 | 3/2012 | Balandin et al. |
| 2012/0079363 A1 | 3/2012 | Folting et al. |
| 2012/0084117 A1 | 4/2012 | Tavares et al. |
| 2012/0084184 A1 | 4/2012 | Raleigh et al. |
| 2012/0084287 A1 | 4/2012 | Lakshminarayan et al. |
| 2012/0123989 A1 | 5/2012 | Yu et al. |
| 2012/0131512 A1 | 5/2012 | Takeuchi et al. |
| 2012/0144335 A1 | 6/2012 | Abein et al. |
| 2012/0158527 A1 | 6/2012 | Cannelongo et al. |
| 2012/0159362 A1 | 6/2012 | Brown et al. |
| 2012/0173381 A1 | 7/2012 | Smith |
| 2012/0188252 A1 | 7/2012 | Law |
| 2012/0191446 A1 | 7/2012 | Binsztok et al. |
| 2012/0197657 A1 | 8/2012 | Prodanovic |
| 2012/0197660 A1 | 8/2012 | Prodanovich |
| 2012/0215784 A1 | 8/2012 | King et al. |
| 2012/0221553 A1 | 8/2012 | Wittmer et al. |
| 2012/0226523 A1 | 9/2012 | Weiss |
| 2012/0226590 A1 | 9/2012 | Love et al. |
| 2012/0245976 A1 | 9/2012 | Kumar et al. |
| 2012/0284670 A1 | 11/2012 | Kashik et al. |
| 2012/0323888 A1 | 12/2012 | Osann, Jr. |
| 2013/0006947 A1 | 1/2013 | Akinyemi et al. |
| 2013/0016106 A1 | 1/2013 | Yip et al. |
| 2013/0054306 A1 | 2/2013 | Bhalla |
| 2013/0057551 A1 | 3/2013 | Ebert et al. |
| 2013/0085745 A1* | 4/2013 | Koister ............ G06F 17/2785 704/9 |
| 2013/0096968 A1 | 4/2013 | Van Pelt et al. |
| 2013/0096988 A1 | 4/2013 | Grossman et al. |
| 2013/0097130 A1 | 4/2013 | Bingol et al. |
| 2013/0110746 A1 | 5/2013 | Ahn |
| 2013/0124193 A1 | 5/2013 | Holmberg |
| 2013/0132348 A1 | 5/2013 | Garrod |
| 2013/0151305 A1 | 6/2013 | Akinola et al. |
| 2013/0151453 A1 | 6/2013 | Bhanot et al. |
| 2013/0166348 A1 | 6/2013 | Scotto |
| 2013/0166480 A1 | 6/2013 | Popescu et al. |
| 2013/0185245 A1 | 7/2013 | Anderson |
| 2013/0185307 A1 | 7/2013 | El-Yaniv et al. |
| 2013/0208565 A1 | 8/2013 | Orji et al. |
| 2013/0226318 A1 | 8/2013 | Procyk |
| 2013/0226879 A1 | 8/2013 | Talukder et al. |
| 2013/0226944 A1 | 8/2013 | Baid et al. |
| 2013/0238616 A1 | 9/2013 | Rose et al. |
| 2013/0246170 A1 | 9/2013 | Gross et al. |
| 2013/0246316 A1 | 9/2013 | Zhao et al. |
| 2013/0246537 A1 | 9/2013 | Gaddala |
| 2013/0246597 A1 | 9/2013 | Iizawa et al. |
| 2013/0263019 A1 | 10/2013 | Castellanos et al. |
| 2013/0268520 A1 | 10/2013 | Fisher et al. |
| 2013/0282696 A1 | 10/2013 | John et al. |
| 2013/0290825 A1 | 10/2013 | Arndt et al. |
| 2013/0297619 A1 | 11/2013 | Chandrasekaran et al. |
| 2013/0304770 A1 | 11/2013 | Boero et al. |
| 2013/0325826 A1 | 12/2013 | Agarwal et al. |
| 2014/0006404 A1 | 1/2014 | McGrew et al. |
| 2014/0012796 A1 | 1/2014 | Petersen et al. |
| 2014/0040371 A1 | 2/2014 | Gurevich et al. |
| 2014/0058914 A1 | 2/2014 | Song et al. |
| 2014/0068487 A1 | 3/2014 | Steiger et al. |
| 2014/0095363 A1 | 4/2014 | Caldwell |
| 2014/0095509 A1 | 4/2014 | Patton |
| 2014/0108074 A1 | 4/2014 | Miller et al. |
| 2014/0108380 A1 | 4/2014 | Gotz et al. |
| 2014/0108985 A1 | 4/2014 | Scott et al. |
| 2014/0123279 A1 | 5/2014 | Bishop et al. |
| 2014/0129936 A1 | 5/2014 | Richards |
| 2014/0136285 A1 | 5/2014 | Carvalho |
| 2014/0143009 A1 | 5/2014 | Brice et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0189536 A1 | 7/2014 | Lange et al. |
| 2014/0195515 A1 | 7/2014 | Baker et al. |
| 2014/0208281 A1 | 7/2014 | Ming |
| 2014/0222521 A1 | 8/2014 | Chait |
| 2014/0222793 A1 | 8/2014 | Sadkin et al. |
| 2014/0229422 A1* | 8/2014 | Jain ................... G06F 17/30592 707/600 |
| 2014/0229554 A1 | 8/2014 | Grunin et al. |
| 2014/0244284 A1 | 8/2014 | Smith |
| 2014/0344230 A1 | 11/2014 | Krause et al. |
| 2014/0358829 A1 | 12/2014 | Hurwitz |
| 2014/0366132 A1 | 12/2014 | Stiansen et al. |
| 2015/0012509 A1 | 1/2015 | Kirn |
| 2015/0025977 A1* | 1/2015 | Doyle ................... G06Q 50/01 705/14.66 |
| 2015/0026622 A1 | 1/2015 | Roaldson et al. |
| 2015/0039565 A1* | 2/2015 | Lucas ............... G06F 17/30595 707/667 |
| 2015/0046481 A1 | 2/2015 | Elliot |
| 2015/0073929 A1 | 3/2015 | Psota et al. |
| 2015/0073954 A1 | 3/2015 | Braff |
| 2015/0089353 A1 | 3/2015 | Folkening |
| 2015/0095773 A1 | 4/2015 | Gonsalves et al. |
| 2015/0100897 A1 | 4/2015 | Sun et al. |
| 2015/0106170 A1 | 4/2015 | Bonica |
| 2015/0106379 A1 | 4/2015 | Elliot et al. |
| 2015/0134599 A1 | 5/2015 | Banerjee et al. |
| 2015/0135256 A1 | 5/2015 | Hoy et al. |
| 2015/0186483 A1 | 7/2015 | Tappan et al. |
| 2015/0188872 A1 | 7/2015 | White |
| 2015/0212663 A1 | 7/2015 | Papale et al. |
| 2015/0242401 A1 | 8/2015 | Liu |
| 2015/0248563 A1* | 9/2015 | Alfarano ............ H04L 12/1831 726/27 |

(56) References Cited

U.S. PATENT DOCUMENTS

| | | | |
|---|---|---|---|
| 2015/0254220 A1 | 9/2015 | Burr et al. | |
| 2015/0338233 A1 | 11/2015 | Cervelli et al. | |
| 2015/0379413 A1 | 12/2015 | Robertson et al. | |
| 2016/0004764 A1 | 1/2016 | Chakerian et al. | |
| 2016/0062555 A1 | 3/2016 | Ward et al. | |

FOREIGN PATENT DOCUMENTS

| | | |
|---|---|---|
| CN | 103167093 | 6/2013 |
| CN | 102054015 | 5/2014 |
| DE | 102014204827 | 9/2014 |
| DE | 102014204830 | 9/2014 |
| DE | 102014204834 | 9/2014 |
| DE | 102014213036 | 1/2015 |
| EP | 1672527 | 6/2006 |
| EP | 2487610 | 8/2012 |
| EP | 2778913 | 9/2014 |
| EP | 2778914 | 9/2014 |
| EP | 2858018 | 4/2015 |
| EP | 2869211 | 5/2015 |
| EP | 2889814 | 7/2015 |
| EP | 2892197 | 7/2015 |
| EP | 2963595 | 1/2016 |
| EP | 2993595 | 3/2016 |
| GB | 2366498 | 3/2002 |
| GB | 2513472 | 10/2014 |
| GB | 2513721 | 11/2014 |
| GB | 2517582 | 2/2015 |
| NL | 2013134 | 1/2015 |
| WO | WO 2001/025906 | 4/2001 |
| WO | WO 2001/088750 | 11/2001 |
| WO | WO 2005/0116851 | 12/2005 |
| WO | WO 2007/133206 | 11/2007 |
| WO | WO 2009/051987 | 4/2009 |
| WO | WO 2010/030913 | 3/2010 |
| WO | WO 2010/030914 | 3/2010 |
| WO | WO 2010/030919 | 3/2010 |
| WO | WO 2012/119008 | 9/2012 |

OTHER PUBLICATIONS

Wikipedia, "Multimap," Jan. 1, 2013, https://en.wikipedia.org/w/index.php?title=Multimap&oldid=530800748.
Notice of Allowance for U.S. Appl. No. 14/323,935 dated Oct. 1, 2015.
Notice of Allowance for U.S. Appl. No. 12/556,307 dated Jan. 4, 2016.
Notice of Allowance for U.S. Appl. No. 14/746,671 dated Jan. 21, 2016.
Notice of Allowance for U.S. Appl. No. 14/094,418 dated Jan. 25, 2016.
Notice of Allowance for U.S. Appl. No. 14/676,621 dated Feb. 10, 2016.
Notice of Allowance for U.S. Appl. No. 14/858,647 dated Mar. 4, 2016.
Notice of Allowance for U.S. Appl. No. 12/556,307 dated Mar. 21, 2016.
Notice of Acceptance for Australian Patent Application No. 2013251186 dated Nov. 6, 2015.
Notice of Acceptance for Australian Patent Application No. 2014203669 dated Jan. 21, 2016.
Official Communication for U.S. Appl. No. 12/556,307 dated Sep. 2, 2011.
Official Communication for U.S. Appl. No. 12/556,307 dated Feb. 13, 2012.
Official Communication for U.S. Appl. No. 12/556,307 dated Oct. 1, 2013.
Official Communication for U.S. Appl. No. 12/556,307 dated Mar. 14, 2014.
Official Communication for U.S. Appl. No. 14/746,671 dated Nov. 12, 2015.
Official Communication for U.S. Appl. No. 14/306,138 dated Dec. 3, 2015.
Official Communication for U.S. Appl. No. 14/463,615 dated Dec. 9, 2015.
Official Communication for U.S. Appl. No. 14/222,364 dated Dec. 9, 2015.
Official Communication for U.S. Appl. No. 14/800,447 dated Dec. 10, 2015.
Official Communication for U.S. Appl. No. 14/225,006 dated Dec. 21, 2015.
Official Communication for U.S. Appl. No. 14/306,147 dated Dec. 24, 2015.
Official Communication for U.S. Appl. No. 14/306,138 dated Dec. 24, 2015.
Official Communication for U.S. Appl. No. 14/883,498 dated Dec. 24, 2015.
Official Communication for U.S. Appl. No. 14/225,084 dated Jan. 4, 2016.
Official Communication for U.S. Appl. No. 14/526,066 dated Jan. 21, 2016.
Official Communication for U.S. Appl. No. 14/225,160 dated Jan. 25, 2016.
Official Communication for U.S. Appl. No. 14/319,765 dated Feb. 1, 2016.
Official Communication for U.S. Appl. No. 14/929,584 dated Feb. 4, 2016.
Official Communication for U.S. Appl. No. 14/871,465 dated Feb. 9, 2016.
Official Communication for U.S. Appl. No. 14/741,256 dated Feb. 9, 2016.
Official Communication for U.S. Appl. No. 14/841,338 dated Feb. 18, 2016.
Official Communication for U.S. Appl. No. 14/715,834 dated Feb. 19, 2016.
Official Communication for U.S. Appl. No. 14/571,098 dated Feb. 23, 2016.
Official Communication for U.S. Appl. No. 12/556,321 dated Feb. 25, 2016.
Official Communication for U.S. Appl. No. 14/225,084 dated Feb. 26, 2016.
Official Communication for U.S. Appl. No. 14/014,313 dated Feb. 26, 2016.
Official Communication for U.S. Appl. No. 14/961,481 dated Mar. 2, 2016.
Official Communication for U.S. Appl. No. 14/883,498 dated Mar. 17, 2016.
Official Communication for U.S. Appl. No. 13/827,491 dated Mar. 30, 2016.
Official Communication for European Patent Application No. 14200246.8 dated May 29, 2015.
Official Communication for Netherlands Patents Application No. 2012421 dated Sep. 18, 2015.
Official Communication for Netherlands Patents Application No. 2012417 dated Sep. 18, 2015.
Official Communication for Netherlands Patent Application 2012438 dated Sep. 21, 2015.
Official Communication for European Patent Application No. 15184764.7 dated Dec. 14, 2015.
Official Communication for Great Britain Patent Application No. 1411984.6 dated Jan. 8, 2016.
Official Communication for European Patent Application No. 15188106.7 dated Feb. 3, 2016.
Official Communication for European Patent Application No. 15190307.7 dated Feb. 19, 2016.
Official Communication for European Patent Application No. 14187996.5 dated Feb. 19, 2016.
Official Communication for European Patent Application No. 14158977.0 dated Mar. 11, 2016.
Official Communication for European Patent Application No. 14158958.0 dated Mar. 11, 2016.
"A Real-World Problem of Matching Records," Nov. 2006, <http://grupoweb.upf.es/bd-web/slides/ullman.pdf< pp. 1-16.

(56) References Cited

OTHER PUBLICATIONS

"A Tour of Pinboard," <http://pinboard.in/tour> as printed May 15, 2014 in 6 pages.
Abbey, Kristen, "Review of Google Docs," May 1, 2007, pp. 2.
Adams et al., "Worklets: A Service-Oriented Implementation of Dynamic Flexibility in Workflows," R. Meersman, Z. Tari et al. (Eds.): OTM 2006, LNCS, 4275, pp. 291-308, 2006.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Appacts, "Smart Thinking for Super Apps," <http://www.appacts.com> Printed Jul. 18, 2013 in 4 pages.
Apsalar, "Data Powered Mobile Advertising," "Free Mobile App Analytics" and various analytics related screen shots <http://apsalar.com> Printed Jul. 18, 2013 in 8 pages.
Bluttman et al., "Excel Formulas and Functions for Dummies," 2005, Wiley Publishing, Inc., pp. 280, 284-286.
Brandel, Mary, "Data Loss Prevention Dos and Don'ts," <http://web.archive.org/web/20080724024847/http://www.csoonline.com/article/221272/Dos_and_Don_ts_for_Data_Loss_Prevention>, Oct. 10, 2007, pp. 5.
Capptain—Pilot Your Apps, <http://www.capptain.com> Printed Jul. 18, 2013 in 6 pages.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on May 18, 2015.
Cohn et al., "Semi-supervised Clustering with User Feedback," Constrained Clustering: Advances in Algorithms, Theory, and Applications 4.1, 2003, pp. 17-32.
Conner, Nancy, "Google Apps: The Missing Manual," May 1, 2008, pp. 15.
Countly Mobile Analytics, <http://count.ly/> Printed Jul. 18, 2013 in 9 pages.
Delicious, <http://delicious.com/> as printed May 15, 2014 in 1 page.
Distimo—App Analytics, <http://www.distimo.com/app-analytics> Printed Jul. 18, 2013 in 5 pages.
"E-MailRelay," <http://web.archive.org/web/20080821175021/http://emailrelay.sourceforge.net/> Aug. 21, 2008, pp. 2.
Flurry Analytics, <http://www.flurry.com/> Printed Jul. 18, 2013 in 14 pages.
Galliford, Miles, "SnagIt Versus Free Screen Capture Software: Critical Tools for Website Owners," <http://www.subhub.com/articles/free-screen-capture-software>, Mar. 27, 2008, pp. 11.
Google Analytics Official Website—Web Analytics & Reporting, <http://www.google.com/analytics.index.html> Printed Jul. 18, 2013 in 22 pages.
Gorr et al., "Crime Hot Spot Forecasting: Modeling and Comparative Evaluation," Grant 98-IJ-CX-K005, May 6, 2002, 37 pages.
"GrabUp—What a Timesaver!" <http://atlchris.com/191/grabup/>, Aug. 11, 2008, pp. 3.
Gu et al., "Record Linkage: Current Practice and Future Directions," Jan. 15, 2004, pp. 32.
Hansen et al. "Analyzing Social Media Networks with NodeXL: Insights from a Connected World", Chapter 4, pp. 53-67 and Chapter 10, pp. 143-164, published Sep. 2010.
Hua et al., "A Multi-attribute Data Structure with Parallel Bloom Filters for Network Services" HiPC 2006, LNCS 4297, pp. 277-288, 2006.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
JetScreenshot.com, "Share Screenshots via Internet in Seconds," <http://web.archive.org/web/20130807164204/http://www.jetscreenshot.com/>, Aug. 7, 2013, pp. 1.
Johnson, Maggie "Introduction to YACC and Bison".
Johnson, Steve, "Access 2013 on demand," Access 2013 on Demand, May 9, 2013, Que Publishing.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Keylines.com, "KeyLines Datasheet," Mar. 2014, <http://keylines.com/wp-content/uploads/2014/03/KeyLines-datasheet.pdf> downloaded May 12, 2014 in 2 pages.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Kontagent Mobile Analytics, <http://www.kontagent.com/> Printed Jul. 18, 2013 in 9 pages.
Kwout, <http://web.archive.org/web/20080905132448/http://www.kwout.com/> Sep. 5, 2008, pp. 2.
Lim et al., "Resolving Attribute Incompatibility in Database Integration: An Evidential Reasoning Approach," Department of Computer Science, University of Minnesota, 1994, <http://reference.kfupm.edu.sa/content/r/e/resolving_attribute_incompatibility_in_d_531691.pdf> pp. 1-10.
Litwin et al., "Multidatabase Interoperability," IEEE Computer, Dec. 1986, vol. 19, No. 12, http://www.lamsade.dauphine.fr/~litwin/mdb-interoperability.pdf, pp. 10-18.
Localytics—Mobile App Marketing & Analytics, <http://www.localytics.com/> Printed Jul. 18, 2013 in 12 pages.
Manno et al., "Introducing Collaboration in Single-user Applications through the Centralized Control Architecture," 2010, pp. 10.
Microsoft, "Registering an Application to a URI Scheme," <http://msdn.microsoft.com/en-us/library/aa767914.aspx>, printed Apr. 4, 2009 in 4 pages.
Microsoft, "Using the Clipboard," <http://msdn.microsoft.com/en-us/library/ms649016.aspx>, printed Jun. 8, 2009 in 20 pages.
Microsoft Windows, "Microsoft Windows Version 2002 Print Out 2," 2002, pp. 1-6.
Mixpanel—Mobile Analytics, <https://mixpanel.com/> Printed Jul. 18, 2013 in 13 pages.
Nadeau et al., "A Survey of Named Entity Recognition and Classification," Jan. 15, 2004, pp. 20.
Nin et al., "On the Use of Semantic Blocking Techniques for Data Cleansing and Integration," 11th International Database Engineering and Applications Symposium, 2007, pp. 9.
Nitro, "Trick: How to Capture a Screenshot As PDF, Annotate, Then Share It," <http://blog.nitropdf.com/2008/03/04/trick-how-to-capture-a-screenshot-as-pdf-annotate-it-then-share/>, Mar. 4, 2008, pp. 2.
Online Tech Tips, "Clip2Net—Share files, folders and screenshots easily," <http://www.online-tech-tips.com/free-software-downloads/share-files-folders-screenshots/>, Apr. 2, 2008, pp. 5.
Open Web Analytics (OWA), <http://www.openwebanalytics.com/> Printed Jul. 19, 2013 in 5 pages.
O'Reilly.com, <http://oreilly.com/digitalmedia/2006/01/01/mac-os-x-screenshot-secrets.html> published Jan. 1, 2006 in 10 pages.
Piwik—Free Web Analytics Software. <http://piwik.org/> Printed Jul. 19, 2013 in18 pages.
Pythagoras Communications Ltd., "Microsoft CRM Duplicate Detection," Sep. 13, 2011, https://www.youtube.com/watch?v=j-7Qis0D0Kc.
Qiang et al., "A Mutual-Information-Based Approach to Entity Reconciliation in Heterogeneous Databases," Proceedings of 2008 International Conference on Computer Science & Software Engineering, IEEE Computer Society, New York, NY, Dec. 12-14, 2008, pp. 666-669.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Schroder, Stan, "15 Ways to Create Website Screenshots," <http://mashable.com/2007/08/24/web-screenshots/>, Aug. 24, 2007, pp. 2.
Sekine et al., "Definition, Dictionaries and Tagger for Extended Named Entity Hierarchy," May 2004, pp. 1977-1980.

(56) References Cited

OTHER PUBLICATIONS

Sigrist et al., "Prosite, a Protein Domain Database for Functional Characterization and Annotation," Nucleic Acids Research 38.Suppl 1, 2010, pp. D161-D166.
SnagIt, "SnagIt Online Help Guide," <http://download.techsmith.com/snagit/docs/onlinehelp/enu/snagit_help.pdf>, TechSmith Corp., Version 8.1, printed Feb. 7, 2007, pp. 284.
SnagIt, "SnagIt 8.1.0 Print Out," Software release date Jun. 15, 2006, pp. 6.
SnagIt, "SnagIt 8.1.0 Print Out 2," Software release date Jun. 15, 2006, pp. 1-3.
StatCounter—Free Invisible Web Tracker, Hit Counter and Web Stats, <http://statcounter.com/> Printed Jul. 19, 2013 in 17 pages.
TestFlight—Beta Testing on the Fly, <http://testflightapp.com/> Printed Jul. 18, 2013 in 3 pages.
Trak.io, <http://trak.io/> printed Jul. 18, 2013 in 3 pages.
UserMetrix, <http://usermetrix.com/android-analytics> printed Jul. 18, 2013 in 3 pages.
Valentini et al., "Ensembles of Learning Machines," M. Marinaro and R. Tagliaferri (Eds.): Wirn Vietri 2002, LNCS 2486, pp. 3-20.
Vose et al., "Help File for ModelRisk Version 5," 2007, Vose Software, pp. 349-353. [Uploaded in 2 Parts].
Wang et al., "Research on a Clustering Data De-Duplication Mechanism Based on Bloom Filter," IEEE 2010, 5 pages.
Warren, Christina, "TUAW Faceoff: Screenshot apps on the firing line," <http://www.tuaw.com/2008/05/05/tuaw-faceoff-screenshot-apps-on-the-firing-line/>, May 5, 2008, pp. 11.
Zhao et al., "Entity Matching Across Heterogeneous Data Sources: An Approach Based on Constrained Cascade Generalization," Data & Knowledge Engineering, vol. 66, No. 3, Sep. 2008, pp. 368-381.
Notice of Allowance for U.S. Appl. No. 14/265,637 dated Feb. 13, 2015.
Notice of Allowance for U.S. Appl. No. 14/479,863 dated Mar. 31, 2015.
Notice of Allowance for U.S. Appl. No. 14/304,741 dated Apr. 7, 2015.
Notice of Allowance for U.S. Appl. No. 14/225,084 dated May 4, 2015.
Notice of Allowance for U.S. Appl. No. 14/319,161 dated May 4, 2015.
Notice of Allowance for U.S. Appl. No. 14/552,336 dated Nov. 3, 2015.
Official Communication for U.S. Appl. No. 14/225,160 dated Jul. 29, 2014.
Official Communication for U.S. Appl. No. 14/304,741 dated Aug. 6, 2014.
Official Communication for U.S. Appl. No. 14/225,084 dated Sep. 2, 2014.
Official Communication for U.S. Appl. No. 14/225,006 dated Sep. 10, 2014.
Official Communication for U.S. Appl. No. 14/451,221 dated Oct. 21, 2014.
Official Communication for U.S. Appl. No. 14/225,160 dated Oct. 22, 2014.
Official Communication for U.S. Appl. No. 14/463,615 dated Nov. 13, 2014.
Official Communication for U.S. Appl. No. 13/827,491 dated Dec. 1, 2014.
Official Communication for U.S. Appl. No. 14/479,863 dated Dec. 26, 2014.
Official Communication for U.S. Appl. No. 14/319,161 dated Jan. 23, 2015.
Official Communication for U.S. Appl. No. 14/483,527 dated Jan. 28, 2015.
Official Communication for U.S. Appl. No. 14/463,615 dated Jan. 28, 2015.
Official Communication for U.S. Appl. No. 14/225,160 dated Feb. 11, 2015.
Official Communication for U.S. Appl. No. 14/225,084 dated Feb. 20, 2015.
Official Communication for U.S. Appl. No. 14/225,006 dated Feb. 27, 2015.
Official Communication for U.S. Appl. No. 14/304,741 dated Mar. 3, 2015.
Official Communication for U.S. Appl. No. 14/571,098 dated Mar. 11, 2015.
Official Communication for U.S. Appl. No. 13/669,274 dated May 6, 2015.
Official Communication for U.S. Appl. No. 14/225,160 dated May 20, 2015.
Official Communication for U.S. Appl. No. 14/463,615 dated May 21, 2015.
Official Communication for U.S. Appl. No. 12/556,307 dated Jun. 9, 2015.
Official Communication for U.S. Appl. No. 14/014,313 dated Jun. 18, 2015.
Official Communication for U.S. Appl. No. 13/827,491 dated Jun. 22, 2015.
Official Communication for U.S. Appl. No. 14/483,527 dated Jun. 22, 2015.
Official Communication for U.S. Appl. No. 12/556,321 dated Jul. 7, 2015.
Official Communication for U.S. Appl. No. 14/552,336 dated Jul. 20, 2015.
Official Communication for U.S. Appl. No. 14/676,621 dated Jul. 30, 2015.
Official Communication for U.S. Appl. No. 14/571,098 dated Aug. 5, 2015.
Official Communication for U.S. Appl. No. 14/225,160 dated Aug. 12, 2015.
Official Communication for U.S. Appl. No. 14/571,098 dated Aug. 24, 2015.
Official Communication for U.S. Appl. No. 13/669,274 dated Aug. 26, 2015.
Official Communication for U.S. Appl. No. 14/225,006 dated Sep. 2, 2015.
Official Communication for U.S. Appl. No. 14/631,633 dated Sep. 10, 2015.
Official Communication for U.S. Appl. No. 14/463,615 dated Sep. 10, 2015.
Official Communication for U.S. Appl. No. 14/225,084 dated Sep. 11, 2015.
Official Communication for U.S. Appl. No. 14/562,524 dated Sep. 14, 2015.
Official Communication for U.S. Appl. No. 14/813,749 dated Sep. 28, 2015.
Official Communication for U.S. Appl. No. 14/746,671 dated Sep. 28, 2015.
Official Communication for U.S. Appl. No. 14/141,252 dated Oct. 8, 2015.
Official Communication for U.S. Appl. No. 13/827,491 dated Oct. 9, 2015.
Official Communication for U.S. Appl. No. 14/483,527 dated Oct. 28, 2015.
Official Communication for U.S. Appl. No. 14/676,621 dated Oct. 29, 2015.
Official Communication for U.S. Appl. No. 14/571,098 dated Nov. 10, 2015.
Official Communication for U.S. Appl. No. 14/562,524 dated Nov. 10, 2015.
Official Communication for U.S. Appl. No. 14/842,734 dated Nov. 19, 2015.
Official Communication for Australian Patent Application No. 2014201506 dated Feb. 27, 2015.
Official Communication for Australian Patent Application No. 2014201507 dated Feb. 27, 2015.
Official Communication for Australian Patent Application No. 2013251186 dated Mar. 12, 2015.
Official Communication for Australian Patent Application No. 2014203669 dated May 29, 2015.
Official Communication for Canadian Patent Application No. 2831660 dated Jun. 9, 2015.

(56) References Cited

OTHER PUBLICATIONS

European Search Report for European Patent Application No. 09813700.3 dated Apr. 3, 2014.
Extended European Search Report for European Patent Application No. 14158958.0 dated Jun. 3, 2014.
Extended European Search Report for European Patent Application No. 14158977.0 dated Jun. 10, 2014.
Official Communication for European Patent Application No. 14187996.5 dated Feb. 12, 2015.
Official Communication for European Patent Application No. 14158977.0 dated Apr. 16, 2015.
Official Communication for European Patent Application No. 14158958.0 dated Apr. 16, 2015.
Official Communication for European Patent Application No. 14200298.9 dated May 13, 2015.
Official Communication for European Patent Application No. 14191540.5 dated May 27, 2015.
Official Communication for European Patent Application No. 12181585.6 dated Sep. 4, 2015.
Official Communication for European Patent Application No. 15181419.1 dated Sep. 29, 2015.
Official Communication for Great Britain Patent Application No. 1404499.4 dated Aug. 20, 2014.
Official Communication for Great Britain Patent Application No. 1404486.1 dated Aug. 27, 2014.
Official Communication for Great Britain Patent Application No. 1404489.5 dated Aug. 27, 2014.
Official Communication for Great Britain Patent Application No. 1404499.4 dated Sep. 29, 2014.
Official Communication for Great Britain Patent Application No. 1404489.5 dated Oct. 6, 2014.
Official Communication for Great Britain Patent Application No. 1411984.6 dated Dec. 22, 2014.
Official Communication for Great Britain Patent Application No. 1404486.1 dated May 21, 2015.
Official Communication for Great Britain Patent Application No. 1404489.5 dated May 21, 2015.
Official Communication for Great Britain Patent Application No. 1404499.4 dated Jun. 11, 2015.
Official Communication for Netherlands Patent Application No. 2013134 dated Apr. 20, 2015.
Official Communication for Netherlands Patent Application No. 2011729 dated Aug. 13, 2015.
Official Communication for New Zealand Patent Application No. 622389 dated Mar. 20, 2014.
Official Communication for New Zealand Patent Application No. 622404 dated Mar. 20, 2014.
Official Communication for New Zealand Patent Application No. 622439 dated Mar. 24, 2014.
Official Communication for New Zealand Patent Application No. 622473 dated Mar. 27, 2014.
Official Communication for New Zealand Patent Application No. 622513 dated Apr. 3, 2014.
Official Communication for New Zealand Patent Application No. 622439 dated Jun. 6, 2014.
Official Communication for New Zealand Patent Application No. 622473 dated Jun. 19, 2014.
Official Communication for New Zealand Patent Application No. 628161 dated Aug. 25, 2014.

* cited by examiner

SYSTEMS AND METHODS FOR STRUCTURING DATA FROM UNSTRUCTURED ELECTRONIC DATA FILES

CROSS-REFERENCE TO RELATED APPLICATIONS

This application claims the benefit of U.S. Provisional Patent Application No. 62/214,856, filed Sep. 4, 2015, entitled "SYSTEMS AND METHODS FOR STRUCTURING DATA FROM UNSTRUCTURED ELECTRONIC DATA FILES," which is incorporated herein in its entirety.

BACKGROUND

Law enforcement agencies increasingly rely on social media data to perform criminal investigations. An agency typically serves a search warrant, national security letter, subpoena, or another type of legal process on a social media platform administrator which provides a legal process return to the agency in response to the legal process. Legal process returns may be provided as electronic data files in a number of formats including, for example, PDF files, text files, spreadsheets, and database files. They can include information such as, for example, contact information, friend lists, private messages, public posts, "tag" and "like" or "favourite" history, phone numbers, login history, and IP address information.

Problems arise when a legal process return is received as an electronic data file that includes unstructured data. The unstructured data, for example, may need to be manually processed by law enforcement agencies in order to aggregate the data and produce useful reports. Such manual processing may require significant amounts of time to accomplish (e.g., weeks or months) and can reduce the value of the acquired information, as the information may become stale or irrelevant during that time. Moreover, the size of unstructured electronic data files can make it difficult or impossible to view the files using native files viewers. For example, legal process returns that include unstructured data can include several hundreds of thousands of pages of data. These electronic data files may exceed sizes of 500 Mb, making it impossible for agencies to view and search the files on conventional data management systems.

BRIEF DESCRIPTION OF THE DRAWINGS

Reference will now be made to the accompanying drawings, which illustrate exemplary embodiments of the present disclosure and in which.

DETAILED DESCRIPTION OF EXEMPLARY EMBODIMENTS

Reference will now be made in detail to exemplary embodiments, the examples of which are illustrated in the accompanying drawings. Whenever possible, the same reference numbers will be used throughout the drawings to refer to the same or like parts.

The disclosed embodiments describe improved methods and systems for structuring data from unstructured electronic data files. The improved data structuring systems and methods can receive electronic data files including unstructured social media content in excess of 500 Mb in size, parse the unstructured content, structure the parsed content by assigning object types and property types to the parsed content, and stored the structured content in a database. The disclosed data structuring systems and methods may aggregate the structured content to generate various types of data reports. The reports may include, for example, reconstructed conversations between a subject and their contacts, a list of normalized phone numbers associated with the subject, a geographic mapping of IP addresses associated with the subject, a list of IP addresses shared between the subject and other persons, a timeline of specific events (logins, subject movement, etc.), and other reports. The data structuring systems and methods may also present the aggregated structured content in an interactive graphical user interface that allows for free-form customization and exploration of the aggregated structured content.

Accordingly, the systems and methods described herein are capable of filtering large amounts of data in a quick, logical, and visually associative way. More specifically, the systems and methods can, among other things, provide the ability to display information about events and entities both temporally and geographically, and allow for the selection and grouping of different entities and events on the graphical representation. Furthermore, the disclosed systems and methods are capable of resolving multiple instances of object and property references across enterprise databases into a canonical format based on a database ontology.

Figure 1:
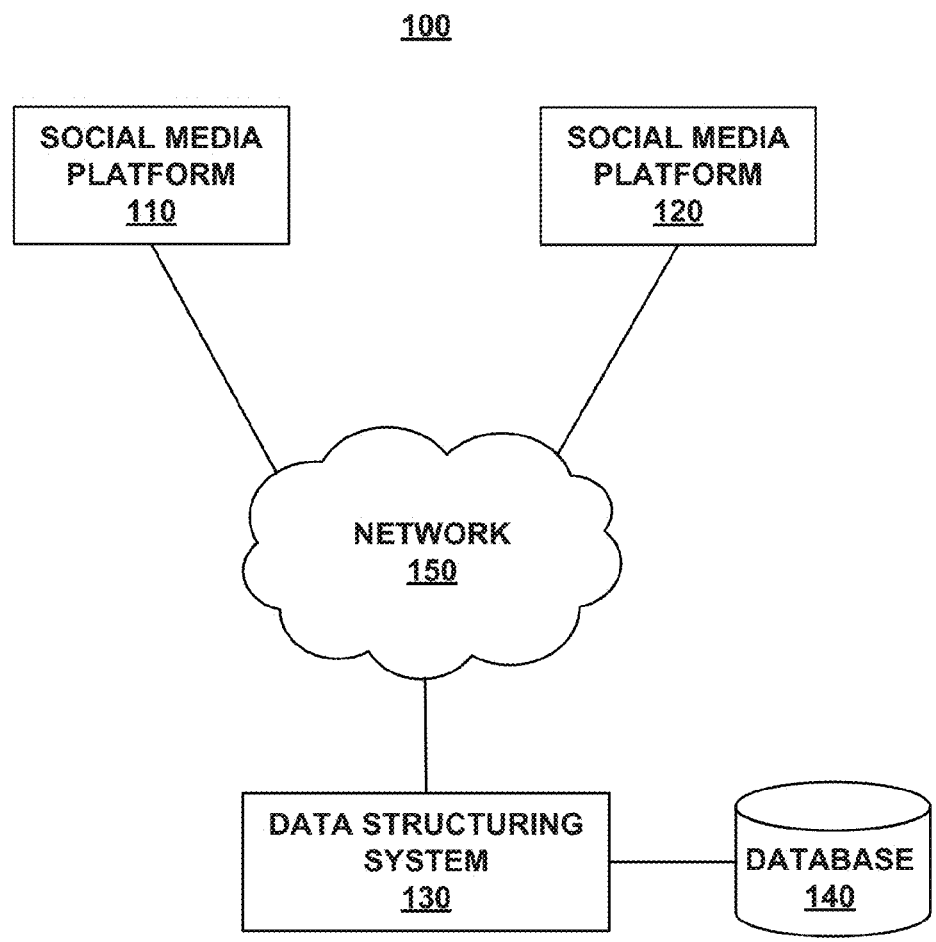
FIG. 1 is a block diagram of an exemplary system for structuring data from unstructured electronic data files, consistent with embodiments of the present disclosure.

FIG. 1 is a block diagram of an exemplary system environment 100 for structuring data from unstructured electronic data files, consistent with embodiments of the present disclosure. As shown in FIG. 1, system environment 100 includes a number of components. It will be appreciated from this disclosure, however, that the number and arrangement of these components is exemplary only and provided for purposes of illustration. Other arrangements and numbers of components may be utilized without departing from the teachings and embodiments of the present disclosure.

As shown in the example embodiment of FIG. 1, system environment 100 may include one or more social media platforms 110, 120. Social media platform 110, 120 may include platforms such as, for example, Facebook, Twitter, Instagram, SureSpot, Kik, PalTalk, or any other social media platform known in the art. Social media platform 110, 120 may be implemented by, for example, a server, a server system comprising a plurality of servers, a server farm comprising a load balancing system and a plurality of servers, a mainframe computer, or any combination of these components. In certain embodiments, social media platform 110, 120 may be a standalone computing system or apparatus, or it may be part of a subsystem, which may be part of a larger system. For example, social media platform 110, 120 may represent distributed servers that are remotely located and communicate over a communications medium (e.g., network 150) or over a dedicated network, for example, a LAN. In some embodiments, social media platform 110, 120 may be implemented with hardware devices and/or software applications running thereon. In some embodiments, social media platform 110, 120 may be configured to communicate to and/or through network 150 with other components such as data structuring system 130 and database 140, and vice-versa. Also, in some embodiments, social media platform 110, 120 may implement aspects of the present disclosure without the need for accessing another device, component, or network, such as network 150.

Network 150 may include any combination of communications networks. For example, network 150 may include the Internet and/or any type of wide area network, an intranet, a metropolitan area network, a local area network (LAN), a wireless network, a cellular communications network, etc. In some embodiments, client 110, 120 may be configured to transmit data and information through network 150 to an appropriate data importer, such as, for example, data importer 130. For example, client 110, 120 may be configured to transmit electronic data files including various types of content to data importer 130. In some aspects, client 110, 120 may also be configured to receive information from data importer 130 through network 150.

Data structuring system 130 may be configured to communicate and interact with social media platform 110, 120, and database 140. In certain embodiments, data structuring system 130 may be standalone system or apparatus, or it may be part of a subsystem, which may be part of a larger system. For example, data structuring system 130 may represent a distributed system that includes remotely located sub-system components that communicate over a communications medium (e.g., network 150) or over a dedicated network, for example, a LAN.

In some embodiments, data structuring system 130 may be configured to receive data and information through network 150 from various devices and systems, such as, for example, social media platform 110, 120. For example, data structuring system 130 may be configured to receive legal process returns in the form of electronic data files from social media platform 110, 120, and other devices and systems. The electronic data files may be received in various file formats and may include content that is provided by social media platform 110, 120 in response to a legal process such as warrant, national security letter, subpoena, etc., relating to a criminal investigation conducted by a law enforcement agency. The content may include social media content associated with a subject of the criminal investigation such as, for example, contact information, friend lists, private messages, phone numbers, login information, IP address information, photos, photo albums, profiles of persons associated with the subject, email addresses, public social media posts (e.g., wall posts, microblog posts such as Tweets, and status updates), location updates (e.g., check-ins and public posts regarding the subject's location), etc. Data structuring system 130 may be configured to structure and import the content included in the received electronic data files into one or more structured databases such as, for example, database 140.

Database 140 may include one or more logically and/or physically separate databases configured to store data. The data stored in database 140 may be received from data structuring system 130, from social media platform 110, 120 and/or may be provided as input using conventional methods (e.g., data entry, data transfer, data uploading, etc.). The data stored in the database 140 may take or represent various forms including, but not limited to, electronic data files, object mappings, property mappings, report templates, user profile information, and a variety of other electronic data or any combination thereof. In some embodiments, database 140 may include separate databases that store electronic data files, object and property mappings, and report templates, respectively. In still some other embodiments, the databases that store electronic data files, object and property mappings, and report templates can be combined into various combinations. In still some other embodiments, database 140 includes a single database that stores electronic data files, object and property mappings, and report templates.

In some embodiments, database 140 may be implemented using any suitable form of a computer-readable storage medium. In some embodiments, database 140 may be maintained in a network attached storage device, in a storage area network, or combinations thereof, etc. Furthermore, database 140 may be maintained and queried using numerous types of database software and programming languages, for example, SQL, MySQL, IBM DB2®, Microsoft Access®, PERL, C/C++, Java®, etc. Although FIG. 1 shows database 140 associated with data structuring system 130, database 140 may be a standalone database that is accessible via network 150, database 140 may be included in data structuring system 130, or database 140 may be associated with or provided as part of a system or environment that may be accessible to social media platform 110, 120 and/or other components.

Figure 2:
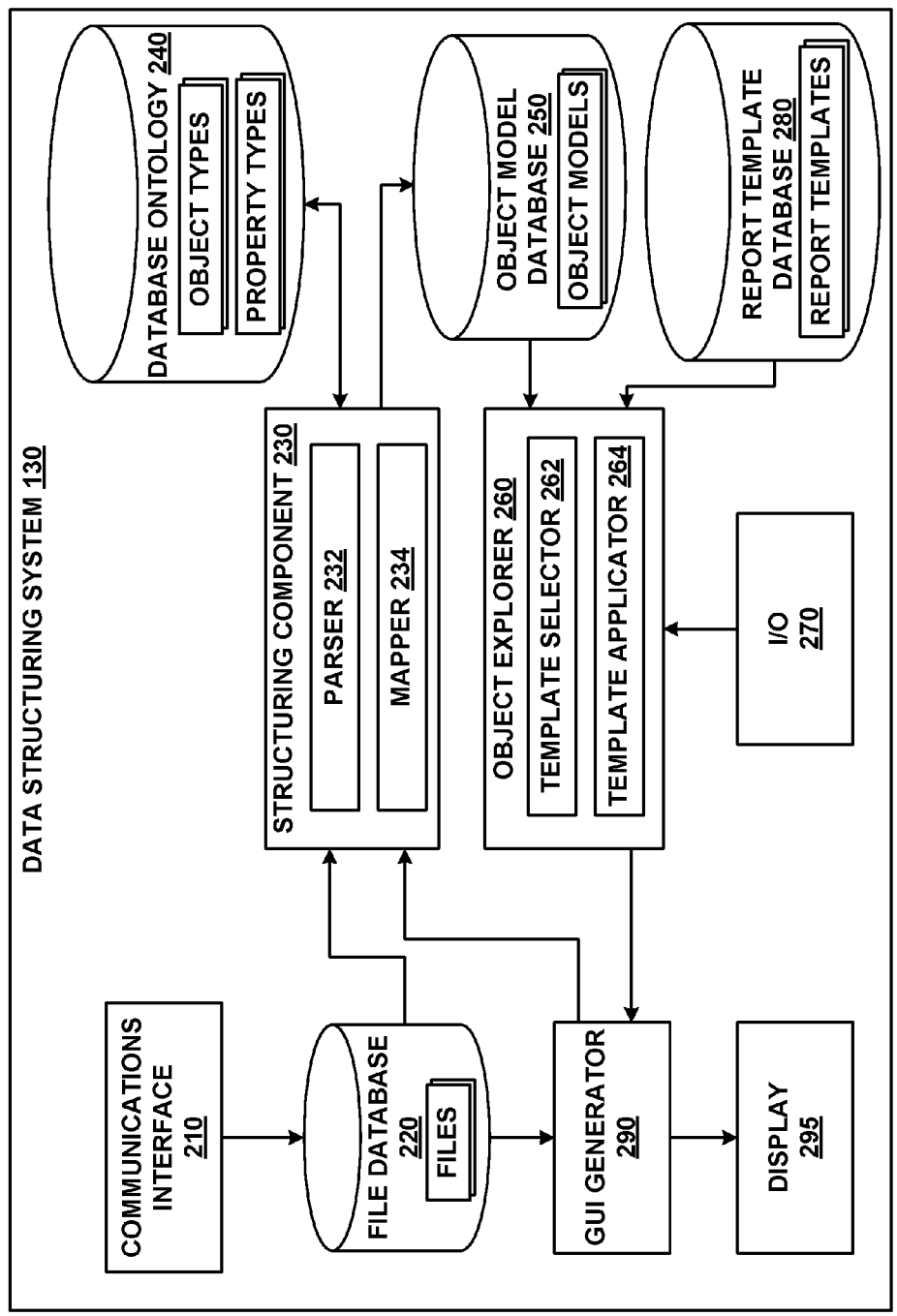
FIG. 2 is a block diagram of an exemplary data structuring system for structuring data from unstructured electronic data files, consistent with embodiments of the present disclosure.

FIG. 2 is a block diagram of an exemplary data structuring system 130 for implementing embodiments and aspects of the present disclosure. For example, data structuring system 130 may be used for structuring data from unstructured electronic data files. The arrangement and number of components included in data structuring system 130 is provided for purposes of illustration. Additional arrangements, number of components, and other modifications may be made, consistent with the present disclosure.

As shown in FIG. 2, data structuring system 130 may include one or more communications interfaces 210. Communications interface 210 may allow data and/or information to be transferred between data structuring system 130 and network 150, social media platform 110, 120, database 140, and/or other components. For example, communications interface 210 may be configured to receive legal process returns in the form of electronic data files that include unstructured content. Some non-limiting examples of electronic data files include word processing files (.pdf, .doc, .docx, .txt, .log, .rtf, etc.), spreadsheets (.xls, .xlsx, .ods, etc.), comma separated values (CSV) files, presentations, archived and compressed files (e.g., ZIP files, 7z files, cab files, RAR files, etc.), database files. PDF files, PUB files, image files, XML files, specialized tax and financial files (e.g., Open Financial Exchange and Interactive Financial Exchange files), tabulated data files and webpage files (e.g., HTML files). The received electronic data files may include various types of unstructured content. For example, the received electronic data files may include social media data associated with a subject of a criminal investigation as described above in reference to FIG. 1.

Examples of communications interface 210 may include a modem, a wired or wireless communications interface (e.g., an Ethernet, Wi-Fi, Bluetooth, Near Field Communication, WiMAX, WAN, LAN, etc.), a communications port (e.g., USB, IEEE 1394, DisplayPort, DVI, HDMI, VGA, Serial port, etc.), a PCMCIA slot and card, etc. Communications interface 210 may receive data and information in the form of signals, which may be electronic, electromagnetic, optical, or other signals capable of being received by communications interface 210. These signals may be provided to communications interface 210 via a communications path (not shown), which may be implemented using wireless, wire, cable, fiber optics, radio frequency ("RF") link, and/or other communications channels.

Data structuring system 130 may also include one or more file databases 220. File database 220 may be configured to store electronic data files received by data structuring system 130 at communications interface 210.

Data structuring system 130 may also include one or more structuring components 230 that may parse the unstructured social media content included the electronic data files stored in file database 220 and structure the parsed data according to a database ontology 240. Exemplary embodiments for defining an ontology (such as database ontology 240) are described in U.S. Pat. No. 7,962,495 (the '495 Patent), issued Jun. 14, 2011, the entire contents of which are expressly incorporated herein by reference. Among other things, the '495 patent describes embodiments that define a dynamic ontology for use in creating data in a database. For creating a database ontology 240, for example, one or more object types may be created where each object type can include one or more properties. The attributes of object types or property types of the database ontology 240 can be edited or modified at any time.

In some embodiments, object types may be further divided into a number of sub-categories. For example, object types may be divided into entity types, event types and document types. Entity types may define a person, place, thing, or idea. Examples, of entity types include social media platform profile (e.g., Facebook™, or Twitter™ user profile), IP address, email address, photo album, friend's list, and location. Event types may define a type of social media platform event associated with the subject of a criminal investigation. Event types may include, for example, the subject logging into their social media platform profile, posting a photo to the subject's social media platform profile, sending friend requests, and accepting friend requests. Document types may define a type of social media platform document created by the subject or the subject's contacts. Examples of document types include private messages, status updates, microblog posts (e.g., Facebook™ wall posts Twitter™ Tweets), comments on other users' microblog posts, pictures, and videos.

In some embodiments, each property type is declared to be representative of one or more object types. A property type is representative of an object type when the property type is intuitively associated with the object type. For example, a property type of "Text/Description" may be representative of an object type "Private Message" but not representative of an object type "Photo Album." In some embodiments, each property type has one or more components and a base type. In some embodiments, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane." An example parser definition specifies an association of imported input data to object property components as follows: {LAST_NAME}, {FIRST_NAME}→Name:Last, Name:First. In some embodiments, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane." The definition Name:Last, Name:First specifies that matching input data values map to components named "Last" and "First" of the Name property. As a result, parsing the unstructured data in an electronic data file using the parser definition results in assigning the value "Smith" to the Name:Last component of the Name property, and the value "Jane" to the Name:First component of the Name property.

In some embodiments, object types and property types may be specific to each social media platform. For example, database ontology 240 may include sets of object types and property types that are specific to Facebook™, Twitter™, Instagram™, etc. In order to determine which set of object/property types to use for an electronic data file, structuring component 230 may scan a header included in the electronic data file to detect a social media platform identifier. For example, the header may include the name Facebook™ and the warrant or subpoena number. Structuring component 230 may detect the name Facebook™ in the file and select the set of Facebook™ object/property types in response.

In some embodiments, parser 232 may parse the unstructured content included in electronic data files stored in files database 220 to identify one or more objects based on the set of object/property types selected by structuring component 230. In order to parse the unstructured content, parser 232 may scan the unstructured content using natural language processing techniques to identify one or more words or strings of words. In some embodiments, where the electronic data files includes text that is unrecognizable by parser 232 (e.g., where the file includes PDF images of text), structuring component 230 may extract the text using techniques such as, for example, optical character recognition, optical word recognition, intelligent character recognition, and intelligent word recognition. Parser 232 may compare the identified words or strings of words to the selected set of object types defined in database ontology 240 to identify object types included in the electronic data file. Once an object type has been identified, parser 232 may identify objects included in the electronic data file of that object type. As an example, parser 232 may identify the string "Registered Email Address" and compare the string to object types defined in database ontology 240. If the string matches a known object type, parser 232 may identify the next string of text as the subject's email address (e.g., johndoe@email.com). A mapper 234 may assign object types and property types to the identified objects. The objects, assigned object types, and assigned property types make up a structured object model of the electronic data file. Each object model may correspond to a legal process return received in response to a legal process for social media platform content associated with a subject. The subject may be, for example, a subject of a criminal investigation conducted by a law enforcement agency. Object models may be stored in an object model database 250 and are described in more detail below in reference to FIG. 3.

In some embodiments, an object explorer 260 may generate an interactive graphical user interface (GUI) that allows for the customization and exploration of the structured objects and properties. For example, the interactive GUI may include various content filters that aggregate the structured objects and properties based on various filter properties. The content filters may, for example, filter objects based on entity type (e.g., IP address, email address, friend's list, etc.), event type (e.g., login events, phot post events, etc.), and document types (e.g., private message, social media profile status update, wall posts, etc.). The content filters may also filter properties based on, for example, property types (e.g., warrant number, online identifier, date range, location, etc.).

Once the structured objects and/or properties have been filtered based on one or more content filters, the interactive GUI may allow for customized data visualizations of the filtered data to be displayed. For example, a timeline of login events may be presented in the interactive GUI when the structured objects are filtered by a login event type. The timeline may display when the login events occurred. When unstructured content associated with multiple subjects have been structured and aggregated, the timeline presentation on the interactive GUI can display how many login events occurred at a given time and which subject logged in at a particular time so that conclusions about real-world interactions between the subjects can be deduced or inferred. In some embodiments, the customized data visualizations of the filtered data can be further customized, or a subset of the visualized data can be selected so that another customized data visualization can be displayed. For example, based on the login timeline example above, a subset of the visualized login data can be selected, geocoded (using a MaxMind database, for example), and used to generate a customized data visualization of a map showing the geographic locations associated with each selected login event. Accordingly, the interactive GUI allows for free-form interaction and customization of the structured objects and properties to generate useful visualizations of the structured objects and properties so that various conclusions and extrapolations can be performed.

As another example of the above interactive GUI, structured photograph objects may be filtered by a MD5 hash property type so that photograph objects stored in object model database 250 with same or similar MD5 hashes can be aggregated and their properties analysed. For example, a photograph with an MD5 hash may have been posted on a social media profile of a subject. The interactive GUI can filter structured photograph objects based on the MD5 hash of the posted photograph to identify other social media profiles associated with subjects that have also posted the same photograph, therefore allowing conclusions and inferences of interactions between subjects who have posted the same photograph to be drawn.

Object explorer may also generate various types of data reports based on the object models stored in object model database 250. The data reports may include data models of objects and properties defined in an object model such as, for example, timelines and geographic mappings of events, histograms of objects and properties, reconstruction of social media conversations (e.g., private message conversations between two or more users), mappings of shared IP addresses between two or more users, picture matching, friends list graphs, and other types of data models.

In order to generate a data report, object explorer may provide instructions to a GUI generator 290 to generate a GUI of object explorer 260. In response to the received instructions, GUI generator 290 may generate an interactive GUI for display on a display 295. Data structuring system 130 may also include one or more input/output (I/O) devices 270 (e.g., physical keyboards, virtual touch-screen keyboards, mice, joysticks, styluses, etc.) that are configured to receive user instructions in the form of user input. The received instructions may include instructions to generate data reports based on objected models stored in object model database 250. Object explorer 260 may receive the user input from I/O 270, generate the request data report based on a report template associated with the requested data report, and may provide instructions to GUI generator 290 for generating a display of the generated data report on display 295.

In some embodiments, object explorer 260 may include a template selector 262 that selects a report template among the report templates stored in a report template database 280. The template selection may be selected based on user input received from I/O 270. For example, the user input received at object explorer 260 may identify a data report type requested by the user, and template selector 262 may retrieve the report template corresponding to the requested data report type. As an example, if the user requests a data report of all the telephone numbers included in an object model, template selector 262 may select a telephone number histogram report template from report template database 280. As another example, if the user requests a data report including a geographic mapping of a subject's social media platform login activity between 10:30 p.m., Jul. 15, 2013 and 3:15 a.m., Jul. 16, 2013, template selector 262 may select the appropriate template from report template database 280.

Once template selector 262 has selected the appropriate report template for the requested data report, a template applicator 264 may obtain objects and properties included in the object model that are required by the report template. Template applicator 264 may generate the requested report using the obtained objects and properties based on the selected report template. Template applicator 264 may provide instructions for GUI generator 290 to display the generated data report on display 295.

Structuring component 230, object explorer 260, and GUI generator 290 may be implemented as hardware modules configured to execute the functions described herein. Alternatively, one or more processors suitable for the execution of instructions may be configured to execute the functions of structuring component 230, object explorer 260, and GUI generator 290. For example, suitable processors include both general and special purpose microprocessors, programmable logic devices, field programmable gate arrays, specialized circuits, and any one or more processors of any kind of digital computer that may be communicatively coupled to a physical memory (not shown) storing structuring component 230, object explorer 260, and GUI generator 290 in the form of instructions executable by the processor. Suitable memories may include, for example, NOR or NAND flash memory devices, Read Only Memory (ROM) devices, Random Access Memory (RAM) devices, storage mediums such as, for example, hard drives, solid state drives, tape drives, RAID arrays, etc. As another example, the functions of structuring component 230, object explorer 260, and GUI generator 290 may be included in the processor itself such that the processor is configured to implement these functions.

File database 220, database ontology 240, object model database 250, and report template database 280 may be implemented by database 140 of FIG. 1. In some embodiments, one or more of databases 220, 240, 250, and 280 may be included in the same database. In some embodiments, one or more of databases 220, 240, 250, and 280 may be included in separate databases.

Display 295 may be implemented using devices or technology, such as a cathode ray tube (CRT) display, a liquid crystal display (LCD), a plasma display, a light emitting diode (LED) display, a touch screen type display such as capacitive or resistive touchscreens, and/or any other type of display known in the art.

Figure 3:
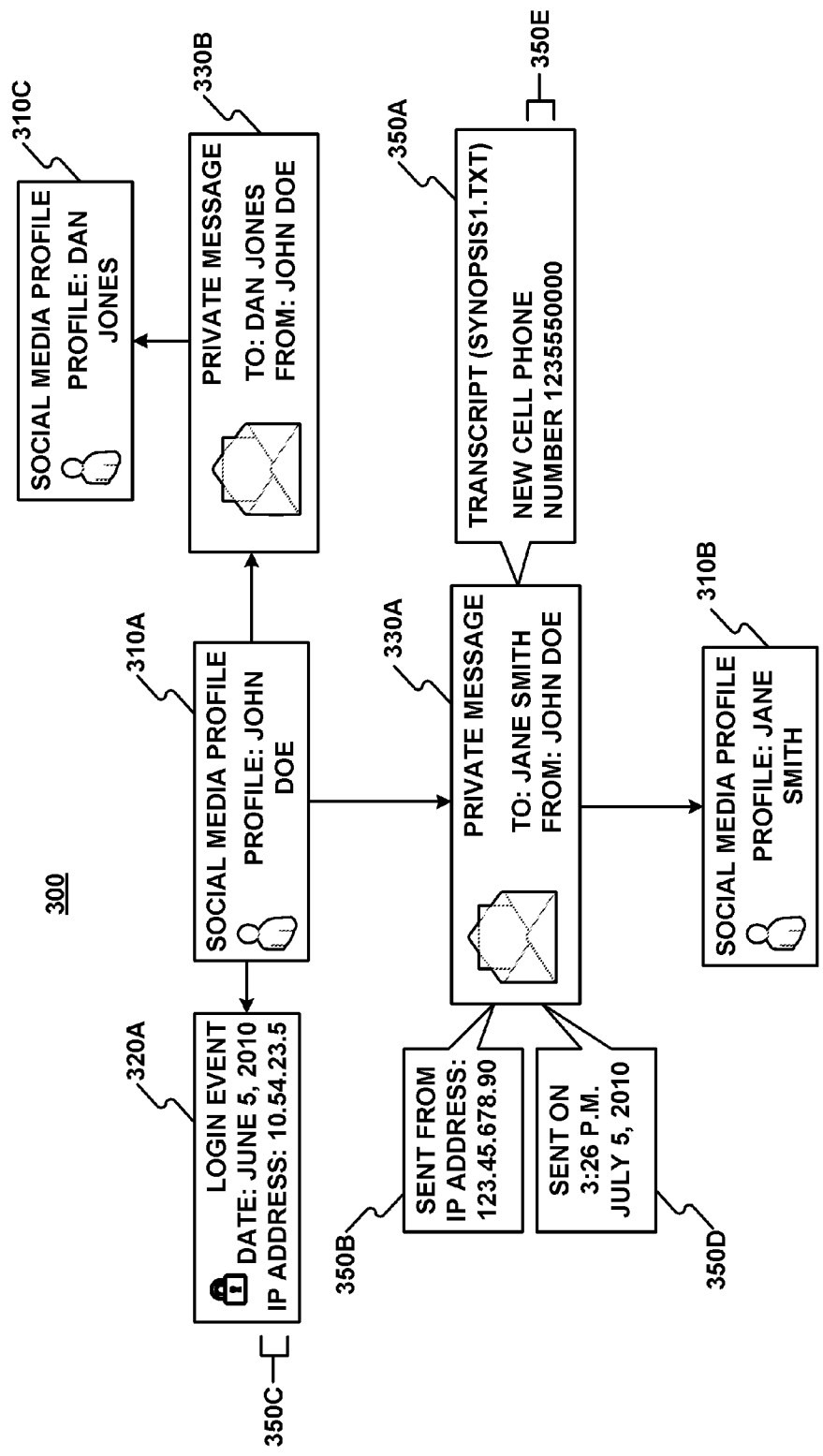
FIG. 3 illustrates an example object model, consistent with embodiments of the present disclosure.

FIG. 3 is illustrative of an exemplary object model 300 and a corresponding ontology (e.g., database ontology 240 in FIG. 2). The elements of exemplary object model 300 can be stored in an object model database (e.g., object model database 250 of FIG. 2).

Object model 300 can include, among other things, entities 310A-C, event 320A, and documents 330A-B. Each entity 310, event 320, and document 330 can further contain properties including, without limitation, representative properties, base properties, or complex properties (e.g., transcript property 350A) made up of multiple sub properties or components. Complex properties can be used to provide detailed information about entities, events, and documents.

As illustrated in FIG. 3, entity 310A may correspond to a social media platform profile associated with the subject of a criminal investigation and entities 310B and 310C may correspond to social media platform profiles associated with persons with whom the subject of a criminal investigation has interacted. For example, the subject may have interacted with the associated persons via private message documents 330A and 330B.

Private message documents 330A and 330B may include various properties such as, for example, a transcript property, an IP address property, "TO" and "FROM" properties, and a "date/time" property. The transcript property, such as transcript property 350A, may contain the text of private message documents (e.g., private message document 330A) as well as additional properties. The additional properties may include, for example, the name of the transcript, the character count, read receipt information, telephone numbers included in the message, and/or any attachments in the message. For example, transcript property 350A may include telephone number property 350E, which may be assigned as a property of private message document 330A. In some embodiments, the transcript property could be in an audio format or some other format instead of written. It is appreciated that many different formats can be commonly used and would be known to one of ordinary skill in the art that could replace a written or audio property.

Additionally, events, documents, and entities can contain notes and media. Notes can provide a container for textual information related to the event, document, or entity. Media can represent binary data associated with the events, documents, or entities. Media data can take the form of, for example, text documents, images, videos, or specialized formats.

Moreover, both objects and properties can contain geospatial and temporal metadata. Geospatial metadata can provide a physical location associated with an object or property. For example, private message document 330A can have an IP address property 350B which can be used to obtain the geographic location of the subject associated with social media profile entity 330A that sent the private message. As another example, login event 320A can have an IP address property 350C associated with the person associated with social media profile entity 310A logging into a social media platform. It is appreciated that the geospatial data can also be in any form that represents a location and is understood by the users of object model 300. Temporal metadata can represent either a specific point in time or a duration having a start time and an end time. For example, private message document 330A can contain a "TIME" property 350D indicating a specific date and time when the message was sent. In some embodiments duration can be indicated by including a start property and end property allowing calculation of the duration. The temporal data can be in any form (e.g., epoch time, UTC time, or local time) that represents the time of the event or the duration of the event. Moreover, in some embodiments, geospatial and temporal metadata can be correlated. For example, the geospatial and temporal metadata can correspond to one or more locations and times when a person visited those one or more locations.

Entities 310, events 320, and documents 330 can serve as links indicating relationships between the various objects. For example, private message document 330A can contain "FROM" and "TO" properties. The "FROM" property links social media profile 310A to private message document 330A and the "TO" property links social media profile 310B to private message document 330A. Thus private message document 330A, while still containing its own relevant properties (e.g., temporal properties, geospatial properties, and transcript property 350A), can act as a complex link between social media profiles 310A and 310B.

Figure 4:
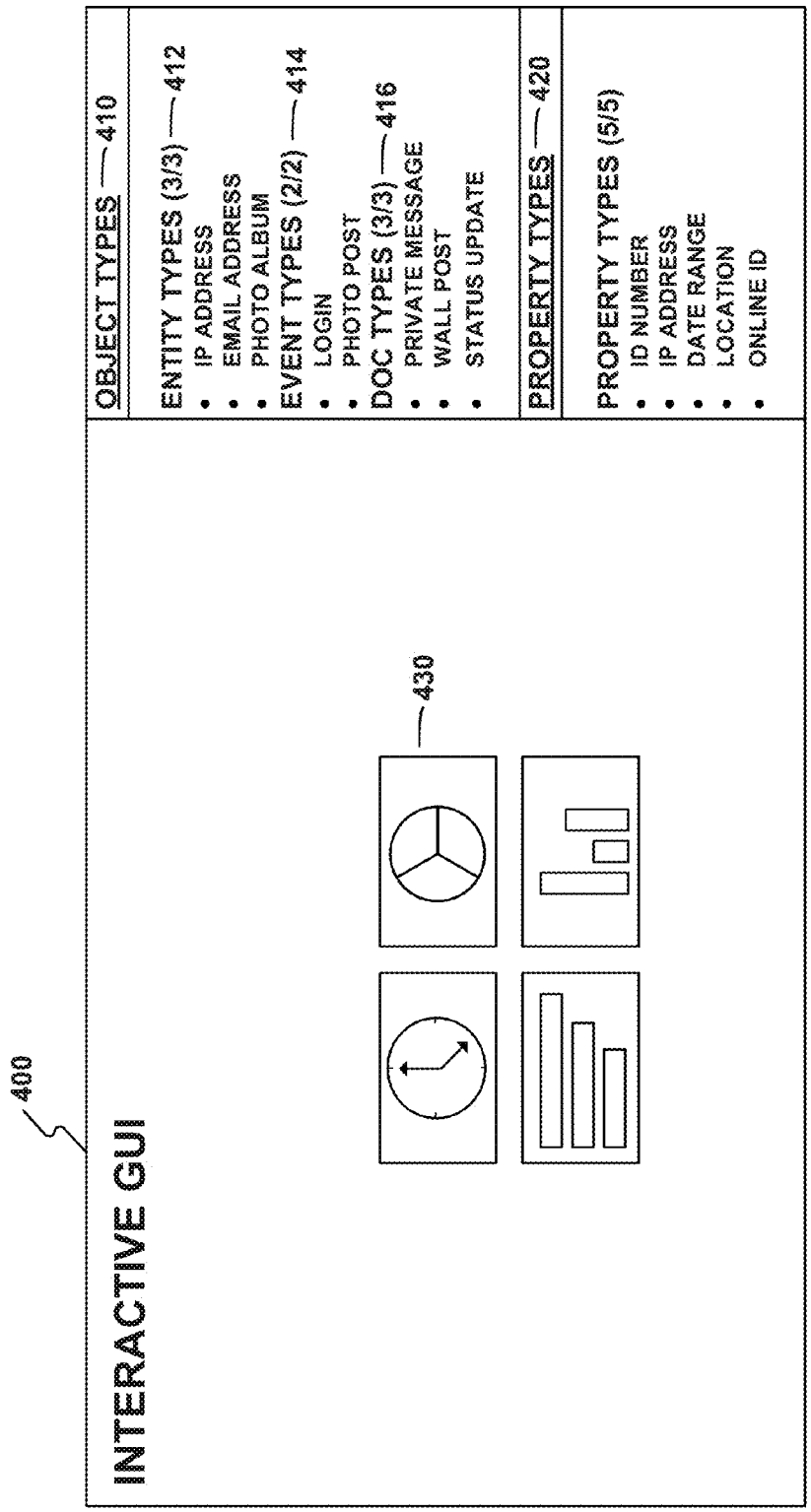
FIG. 4 illustrates and example implementation of an interactive GUI, consistent with embodiments of the present disclosure.

FIG. 4 illustrates and example implementation of an interactive GUI 400 for free-form exploration of structured objects and properties. In some embodiments, example interactive GUI 400 may be generated by a data structuring system (e.g., data structuring system 130 including an object explorer 260, both of FIG. 2). GUI 400 may include a set of content filters such as, for example, object types 410 and property types 420. The object types 410 filter may further be divided into sub-filters such as, for example, entity types 412, event types 414, and document types 416. Content filters 410-416 and 420 are exemplary only and other filters may also be included in GUI 400. Content filters 410-416 and 420 allow for the aggregation of structured objects and properties so that customized data visualizations may be generated.

In some embodiments, GUI 400 may allow for customized data visualizations of data filtered by content filters 410-416 and 420 to be displayed. GUI 400 may include various visualization types 430 that can be used to generate displays of the filtered data. In the example illustrated in FIG. 4, a timeline visualization type, a pie chart visualization type, a histogram visualization type, and a bar chart visualization type are included in GUI 400. Other visualization types 430 and combinations of visualization types 430 may be included in GUI 400. In some embodiments, the visualization types 430 presented on GUI 400 may depend on the type of content filter selected. For example, if a login event type 416 filter is selected, GUI 400 may display a timeline visualization type (that displays the login events on a timeline), a histogram visualization type (that displays the number of login events associated with various IP addresses), and a pie chart visualization type.

A customized data visualization may be generated using various techniques. For example, input may be received (from I/O 270 of FIG. 2, for example) in the form of a selection of an object type 410 or a property type 420 and a visualization type 430. The input may be received in various forms. For example, the input may be a user selecting an object type 410 or a property type 420 and dragging it on top of a visualization type 430. As another example, the input may be a user highlighting an object type 410 or a property type 420 (by clicking on it, for example) and highlighting a visualization type 430.

In some embodiments, the customized data visualizations displayed on GUI 400 can be further customized, or a subset of the visualized data can be selected so that another customized data visualization can be displayed.

Figure 5:
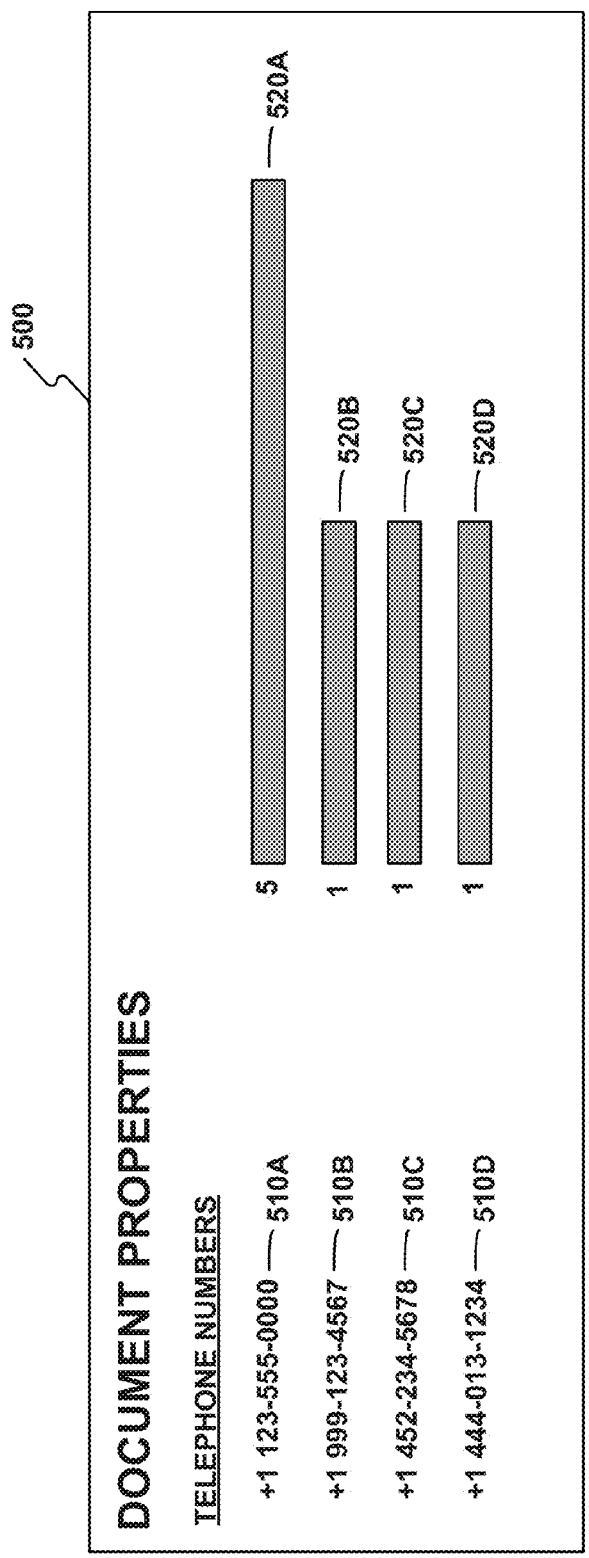
FIGS. 5-7B illustrate embodiments of example data reports generated by the exemplary data structuring system of FIG. 2, consistent with embodiments of the present disclosure.

FIGS. 5-7B illustrate example implementations of data reports. In some embodiments, the example data reports may be generated by a data structuring system (e.g., data structuring system 130 including an object explorer 260, both of FIG. 2). FIG. 5 in particular illustrates an example implementation of a telephone number histogram data report 500. As shown in FIG. 5, data report 500 may include a list of telephone numbers 510A-D. Telephone numbers 510A-D may have been included in one or more private messages (e.g., private message document 330A of FIG. 3) between a subject of a criminal investigation and another person (e.g., John Doe, entity 310A, and Jane Smith, entity 310B, both of FIG. 3). A parser (e.g., parser 232 of FIG. 2) may have parsed the private messages to identify and normalize telephone numbers 510A-D to a telephone number format required by a database ontology (e.g., database ontology 240 of FIG. 2). As shown in data report 500, the data structuring system may represent the number of times a telephone number 510A-D has shown up in a private message between the subject and another person as a histogram. The histogram may include data bars 520A-D that graphically represent the number of times each telephone number 510A-D has shown up in a private message. The histogram may also include a numeric representation of the number of times each telephone number 510A-D has shown up in a private message proximate to data bars 520A-D. In some embodiments, and as shown in FIG. 5, telephone numbers 510A-D (and data bars 520A-D by extension) may be ordered such the telephone number included in the most private messages between the subject and another person is listed first (e.g., telephone number 510A).

In some embodiments, a user may interact with telephone numbers 510A-D via an I/O (e.g., I/O 270 of FIG. 2). The data structuring system may display a list of the private messages that included the telephone number 510A-D in response to the user's interaction.

Figure 6:
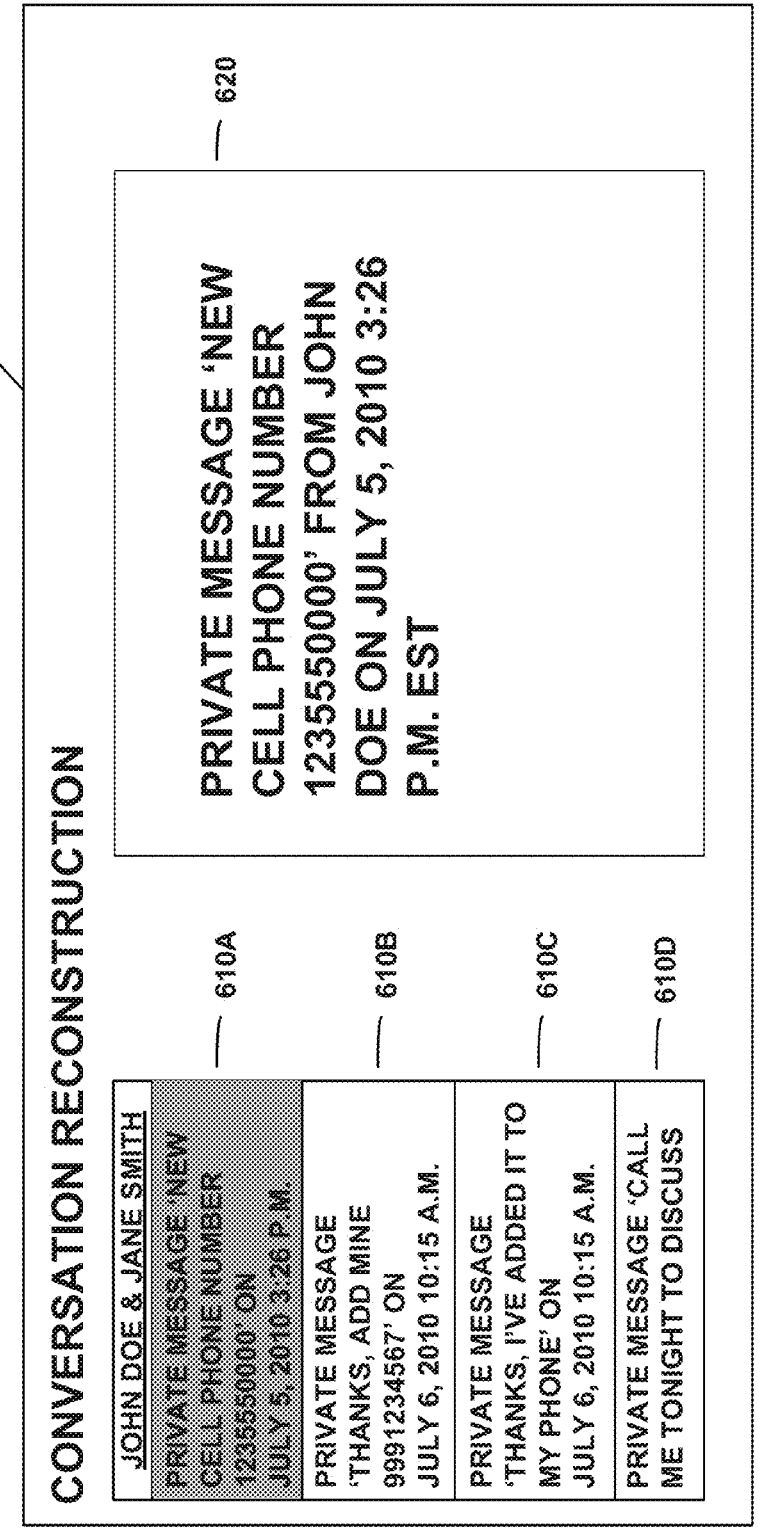

FIG. 6 illustrates an example implementation of a conversation reconstruction data report 600. As shown in FIG. 6, data report 600 may include a list of private messages 610A-D. Private messages 610A-D may have been sent between a subject of a criminal investigation and another person (e.g., John Doe, entity 310A, and Jane Smith, entity 310B, both of FIG. 3). The data structuring system may generate display data report 600 by, for example, identifying private messages included in one or more object models (e.g., object model 300 of FIG. 3) stored in an object model database (e.g., object model database 250 of FIG. 2). The private messages may be identified based on the private messages with combinations of "TO" and "FROM" properties that include John Doe and Jane Smith.

Data report 600 allows users to interact with private messages 610A-D. For example, a user may select a private message 610A-D via an I/O. In the example illustrated in FIG. 6, private message 610A has been selected by the user. In response, the data structuring system may generate a detailed display 620 of selected private message 610A. For example, detailed display 620 may include the entire content of selected private message 610A, the "TO" and "FROM" properties of private message 610A, and the "DATE" and "TIME" properties of private message 610A.

Figure 7A:
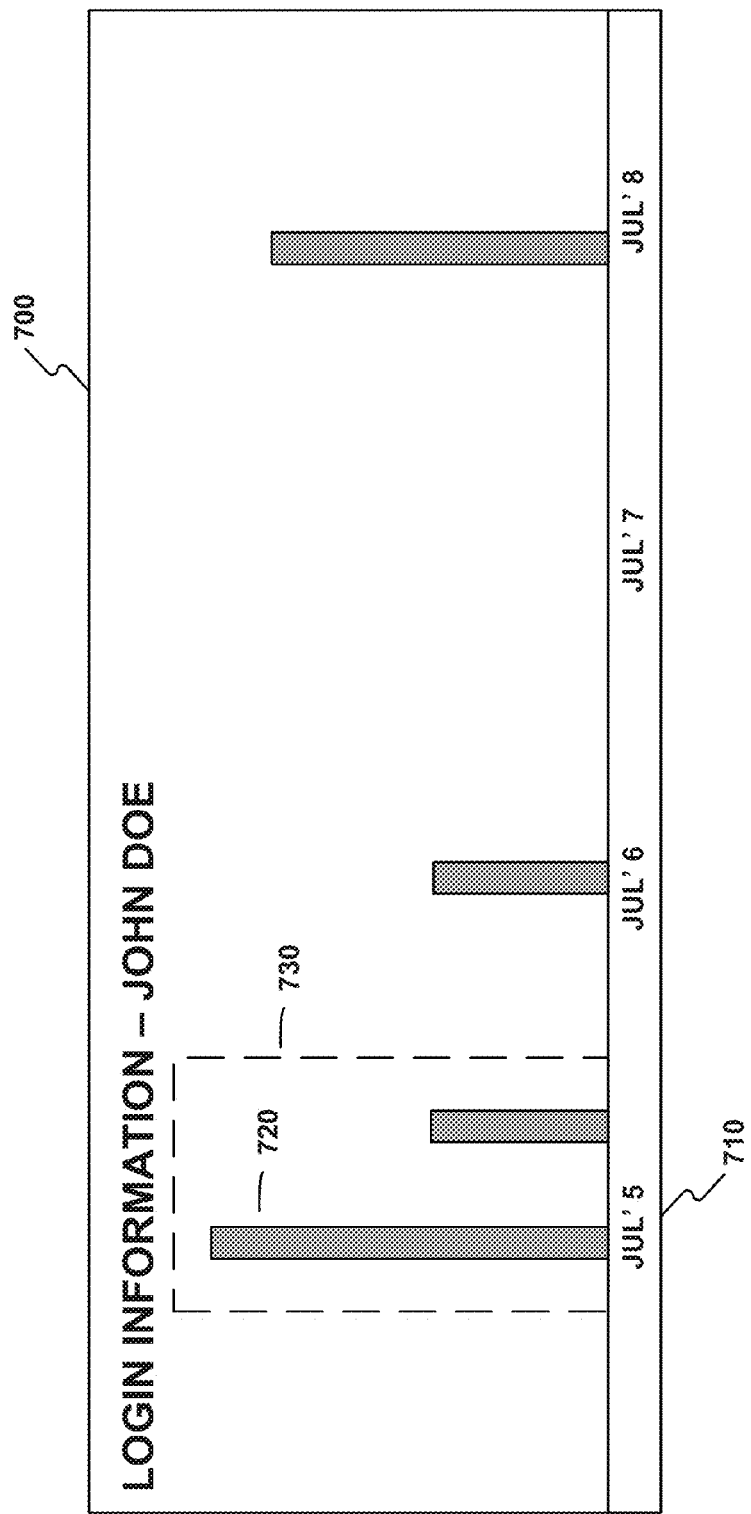
Figure 7B:
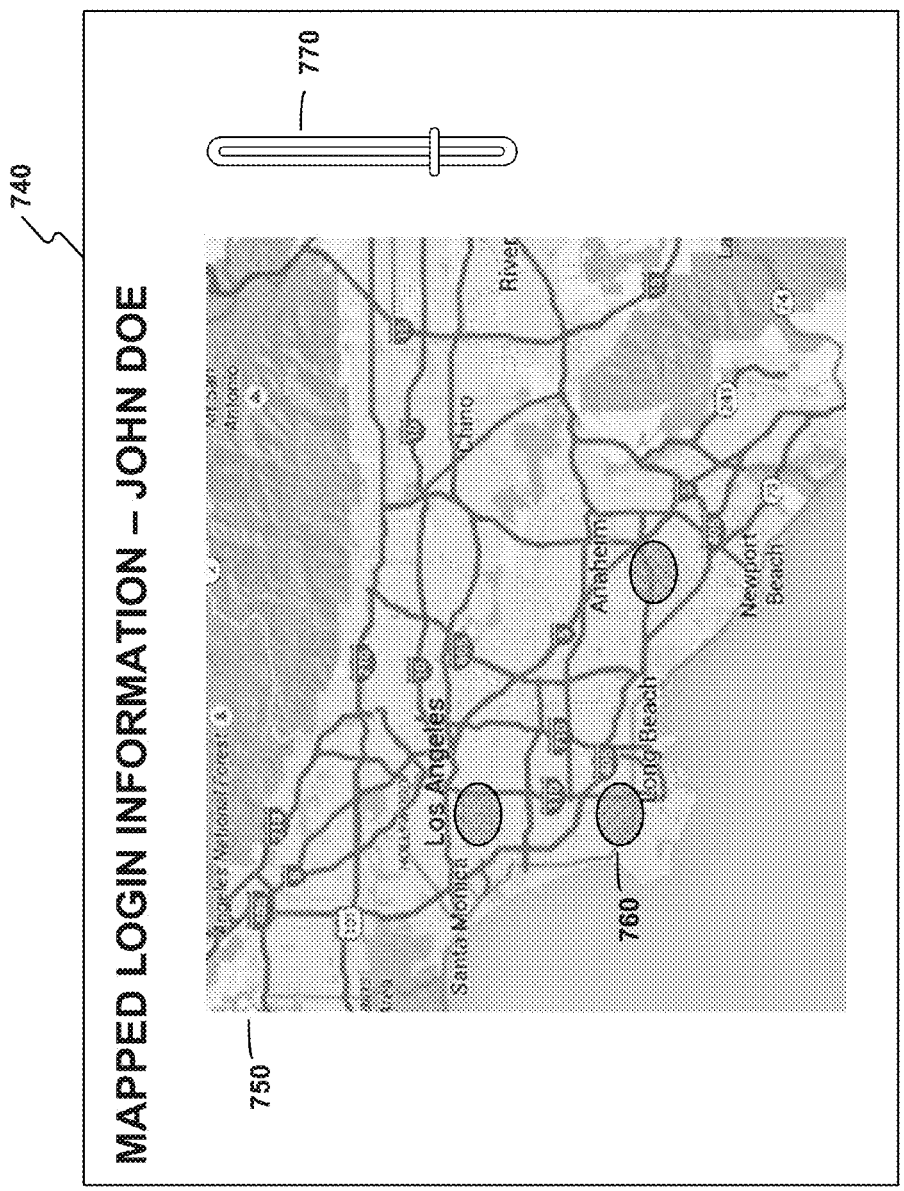

FIGS. 7A and 7B illustrate an example implementation of a login information data report 600 and a mapped login information data report 730, respectively. As shown in FIG. 7A, data report 700 may include a timeline 710 across which login data 720 are distributed. Login data 720 may correspond to login events such as, for example, a subject of a criminal investigation logging into a social media platform. Each bar of login data 720 may represent the number of login events that occurred at certain points in time along timeline 710. Each bar of login data 720 may span a specified time duration. For example, each bar of login data 720 may cover a one-hour time interval, a 30-minute time interval, or any other time interval.

In some embodiments, data report 700 may be an interactive data report. For example, the data structuring system may be configured to receive input from a user corresponding to a selection of a subset of login data 620. The user may highlight a time interval of login data 720 along timeline 710. As shown in the example illustrated in FIG. 7A, a subset 730 has been selected.

A data report illustrating the subset 730 of login data 720 geographically mapped may be displayed in response to the data structuring system receiving the user's selection of subset 730. For example, mapped login information data report 740 illustrated in FIG. 7B may include the subset 730 of login data 720 superimposed over a map 750. A scale adjuster 770 may be used to zoom map 750 in and/or out so that more granularity can be obtained or more of subset 730 can be displayed at one time.

Data report 740 may illustrate the subject's locations 760 at the time of each login event included in the subset 730 of login data 720. In other words, locations 760 correspond to the subject's geographic location at the time the subject logged into the social media platform. In order to superimpose the subset 730 of login data 720 over map 750, the IP address properties associated with each login event may be traced by the data structuring system to obtain a set of geographic coordinates or other location data associated with the login event. Data structuring system may display the obtained location data as locations 760 over map 750.

It is to be understood that the example data reports illustrated in FIG. 5-7B are exemplary only and that other data reports are contemplated. Another example data report may include a picture matching report. For a picture matching report, a data structuring system may determine a identifier associated with a picture selected by a user and may use the identifier to identify all the social media platform profiles associated with the picture (e.g., that include the photo in a photo album, wall post, private message, etc.). Identifiers may include, for example, EXIF data, MD5 hash values, or other identifiers known in the art. The data structuring system may display the identified profiles as a graph, histogram, or any other format of data report.

Another data report may include a shared IP address data report. The shared IP address data report may include all the social media platform profiles associated with login events having the same IP address property. For example, a user may select an IP address associated with a subject of a criminal investigation logging into a social media platform. The data structuring system may determine all the social media platform profile logins using the same IP address, and display the identified profiles as a graph, histogram, or any other format of data report.

Figure 8:
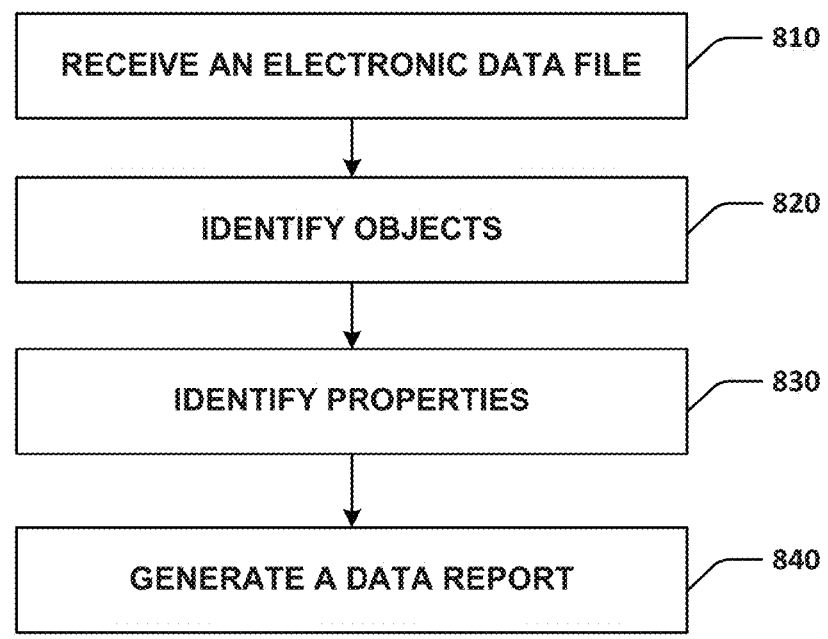
FIG. 8 is a flow diagram depicting an example method for structuring data from unstructured electronic data files, consistent with embodiments of the present disclosure.

FIG. 8 depicts a flowchart of an example method 800, consistent with some embodiments and aspects of the present disclosure. Method 800 may be implemented, for example, for structuring data from unstructured electronic data files. The number and sequence of operations in FIG. 8 are provided for purposes of illustration and may be modified, enhance, substituted, or otherwise changed, in view of the present disclosure. In some embodiments, method 800 may be implemented as one or more computer programs executed by one or more processors. Moreover, in some embodiments, aspects of method 800 may be implemented by a data structuring system (e.g., data structuring system 130 having one or more processors executing one or more computer programs stored on a non-transitory computer readable medium) or a social media platform (e.g., social media platform 110, 120 having one or more processors executing one or more computer programs stored on a non-transitory computer readable medium). In some embodiments, method 800 may be implemented by a combination of a data importation system and a client device.

In some embodiments, example method 800 may include receiving an electronic data file at 810. For example, the data structuring system may receive legal process returns in the form of electronic data files from one or more social media platforms via a communications interface (e.g., communications interface 210 of FIG. 2). The legal process returns may be provided, for example, in response to a legal process such as a search warrant, national security letter, subpoena, etc., associated with a criminal investigation of a subject conducted by a law enforcement agency. The electronic data files may include any electronic file format and various types of structured and/or unstructured content. Example electronic data file formats include word processing files (.doc, .docx, .txt, .log, .rtf, etc.), spreadsheets (.xls, .xlsx, .ods, etc.), comma separated values (CSV) files, presentations, archived and compressed files (e.g., ZIP files, 7z files, cab files, RAR files, etc.), database files, PDF files, PUB files, image files, XML files, specialized tax and financial files (e.g., Open Financial Exchange and Interactive Financial Exchange files), tabulated data files and webpage files (e.g., HTML files). The content may include, for example, social media data associated with the subject of the criminal investigation as described above in reference to FIG. 1.

In some embodiments, example method 800 may include parsing the electronic data file to identify one or more objects included in the electronic data file at 820. For example, when the content included in the electronic data file received at 810 is unstructured content, the data structuring system may parse the unstructured data so that the data can be converted to a structured format. In some embodiments, the data structuring system includes a parser (e.g., parser 232 of FIG. 2) that parses the unstructured content using the parsing techniques described above in reference to FIG. 2. For example, the parser may identify words or strings of words in the received electronic data file and compare the identified words or strings of words to a selected set of object types defined in a database ontology (e.g., database ontology 240 of FIG. 2) to identify objects included in the electronic data file.

In some embodiments, example method 800 may include processing the unstructured content to identify one or more properties associated with the identified objects at 830. For example, the data structuring system may include a mapper (e.g., mapper 234 of FIG. 2) that assigns properties to the objects identified at 820. The objects, assigned object types, and assigned property types may be assigned to a structured object model (e.g., object model 300 of FIG. 3) of the electronic data file corresponding to the legal process return. In some embodiments, the object models may be stored in an object model database (e.g., object model database 250 of FIG. 2).

In some embodiments, example method 800 may include generating a data report at 840. For example, the data report may be generated by an object explorer of the data structuring system (e.g., object explorer 260 of FIG. 2). In some embodiments, the generated data report may be an interactive GUI (e.g., interactive GUI 400 of FIG. 4) that allows for free-form exploration and customization of the identified objects and properties. In some other embodiments, the generated data report may include any of the example data reports illustrated in FIGS. 5-7B and described above.

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the exemplary methods or processes disclosed herein.

What is claimed is:

1. A data structuring system for structuring data from electronic data files of a social media platform received in association with a legal process return, the system comprising:

a memory device that stores a set of instructions;

at least one processing device configured to execute the instructions to:

receive an electronic data file, the electronic data file including unstructured content of the social media platform received in association with the legal process return;

determine, based on scanning a header included in the electronic data file, that the electronic data file includes data received from the social media platform;

identify, from a plurality of database ontologies corresponding to a plurality of social media platforms, a database ontology corresponding to the social media platform associated with the electronic data file, the database ontology defining known data objects and corresponding property types for unstructured data received from the social media platform;

parse the unstructured content to identify a first string in the unstructured content;

compare the first string to the known data objects defined in the database ontology corresponding to the social media platform, yielding a comparison;

determine, based on the comparison, that the first string matches a first known data object defined in the database ontology corresponding to the social media platform, the first data object being of a first data object type that is associated with a first property type;

in response to determining that the first string matches the first known data object, identify the first string as a first identified object in the unstructured content and assign the first object type to the first string;

parse the electronic data file to identify a second string that follows the first string in the unstructured content;

identify the second string as a first identified property of the first identified object in the unstructured content and assign the first property type to the second string; and generate a data report based on the first identified data object and the first identified property.

2. The system of claim 1, wherein the electronic data file associated with the legal process return is received in response to a legal process.

3. The system of claim 2, wherein the legal process includes at least one of a warrant, a national security letter, and a subpoena.

4. The system of claim 1, wherein the first identified data object is a private message, and the first identified property is an identifier included in the private message.

5. The system of claim 4, wherein the at least one processing device is configured to execute the instructions to:

parse the identifier to normalize the identifier.

6. The system of claim 1, wherein the data report includes at least one of a list of histogramed telephone number data report, a conversation reconstructed from one or more private messages, a login information data report, a picture mapping data report, and a shared IP address data report.

7. A method of structuring data from unstructured electronic data files of a social media platform received in association with a legal process return, the method performed by at least one processing device and comprising:

receiving an electronic data file, the electronic data file including unstructured content of the social media platform received in association with the legal process return;

determining, based on scanning a header included in the electronic data file, that the electronic data file includes data received from the social media platform;

identifying, from a plurality of database ontologies corresponding to a plurality of social media platforms, a database ontology corresponding to the social media platform associated with the electronic data file, the database ontology defining known data objects and corresponding property types for unstructured data received from the social media platform;

parsing the unstructured content to identify a first string in the unstructured content;

comparing the first string to the known data objects defined in the database ontology corresponding to the social media platform, yielding a comparison;

determining, based on the comparison, that the first string matches a first known data object defined in the database ontology corresponding to the social media platform, the first data object being of a first data object type that is associated with a first property type;

in response to determining that the first string matches the first known data object, identifying the first string as a first identified object in the unstructured content and assign the first object type to the first string;

parse the electronic data file to identify a second string that follows the first string in the unstructured content;

identifying the second string as a first identified property of the first identified object in the unstructured content and assign the first property type to the second string; and generating a data report based on the first identified data object and the first identified property.

8. The method of claim 7, wherein the electronic data file associated with the legal process return is received in response to a legal process.

9. The method of claim 8, wherein the legal process includes at least one of a warrant, a national security letter, and a subpoena.

10. The method of claim 7, wherein the data report is an interactive data report.

11. The method of claim 10, wherein the first identified data object is a private message, and the first identified property is an identifier included in the private message.

12. The method of claim 7, wherein the report includes at least one of a list of histogramed telephone number data report, a conversation reconstructed from one or more private messages, a login information data report, a picture mapping data report, and a shared IP address data report.

13. A non-transitory computer-readable medium storing a set of instructions that, when executed by one or more processors, cause the one or more processing devices to perform a method of structuring data from unstructured electronic data files of a social media platform received in association with a legal process return, the method comprising:

receiving an electronic data file, the electronic data file including unstructured content of the social media platform received in association with the legal process return;

determining, based on scanning a header included in the electronic data file, that the electronic data file includes data received from the social media platform;

identifying, from a plurality of database ontologies corresponding to a plurality of social media platforms, a database ontology corresponding to the social media platform associated with the electronic data file, the database ontology defining known data objects and corresponding property types for unstructured data received from the social media platform;

parsing the unstructured content to identify a first string in the unstructured content;

comparing the first string to the known data objects defined in the database ontology corresponding to the social media platform, yielding a comparison;

determining, based on the comparison, that the first string matches a first known data object defined in the database ontology corresponding to the social media platform, the first data object being of a first data object type that is associated with a first property type;

in response to determining that the first string matches the first known data object, identifying the first string as a first identified object in the unstructured content and assign the first object type to the first string;

parse the electronic data file to identify a second string that follows the first string in the unstructured content;

identifying the second string as a first identified property of the first identified object in the unstructured content and assign the first property type to the second string; and generating a data report based on the first identified data object and the first identified property.

* * * * *